(12) United States Patent
Borovikov et al.

(10) Patent No.: US 11,724,184 B2
(45) Date of Patent: Aug. 15, 2023

(54) 2.5D GRAPHICS RENDERING SYSTEM

(71) Applicant: Electronic Arts Inc., Redwood City, CA (US)

(72) Inventors: Igor Borovikov, Foster City, CA (US); Mohsen Sardari, Redwood City, CA (US)

(73) Assignee: ELECTRONIC ARTS INC., Redwood City, CA (US)

(*) Notice: Subject to any disclaimer, the term of this patent is extended or adjusted under 35 U.S.C. 154(b) by 0 days.

(21) Appl. No.: 17/240,860

(22) Filed: Apr. 26, 2021

(65) Prior Publication Data
US 2021/0316212 A1    Oct. 14, 2021

Related U.S. Application Data

(62) Division of application No. 15/939,166, filed on Mar. 28, 2018, now Pat. No. 10,987,579.

(51) Int. Cl.
*A63F 13/355* (2014.01)
*A63F 13/52* (2014.01)
*A63F 13/335* (2014.01)

(52) U.S. Cl.
CPC .......... *A63F 13/355* (2014.09); *A63F 13/335* (2014.09); *A63F 13/52* (2014.09)

(58) Field of Classification Search
CPC ....... A63F 13/355; A63F 13/335; A63F 13/52
See application file for complete search history.

(56) References Cited

U.S. PATENT DOCUMENTS

| | | | |
|---|---|---|---|
| 5,953,506 A | 9/1999 | Kalra et al. | |
| 6,421,058 B2 | 7/2002 | Parikh et al. | |
| 6,570,564 B1 | 5/2003 | Sowizral et al. | |
| 6,631,403 B1 | 10/2003 | Deutsch et al. | |
| 6,636,214 B1 | 10/2003 | Leather et al. | |
| 7,100,020 B1 | 8/2006 | Brightman et al. | |
| 7,159,217 B2 | 1/2007 | Pulsipher et al. | |
| 7,796,155 B1 | 9/2010 | Neely, III et al. | |
| 8,171,461 B1 | 5/2012 | Kilgard et al. | |
| 8,200,796 B1 | 6/2012 | Margulis | |
| 8,266,213 B2 | 9/2012 | Crowder | |
| 8,319,825 B1 | 11/2012 | Urbach | |
| 8,341,550 B2 | 12/2012 | de Heer | |

(Continued)

FOREIGN PATENT DOCUMENTS

KR    10-2019-0028737 A    3/2019

OTHER PUBLICATIONS

Ito, Asynch Queue, 2012, in 7 pages.

*Primary Examiner* — Said Broome
(74) *Attorney, Agent, or Firm* — Knobbe, Martens, Olson & Bear, LLP

(57) ABSTRACT

A graphics rendering system is disclosed for generating and streaming graphics data of a 3D environment from a server for rendering on a client in 2.5D. 2D textures can be transmitted in advance of frames showing the textures. Data transmitted for each frame can include 2D vertex positions of 2D meshes and depth data. The 2D vertex positions can be positions on a 2D projection as seen from a viewpoint within the 3D environment. Data for each frame can include changes to vertex positions and/or depth data. A prediction system can be used to predict when new objects will be displayed, and textures of those new objects can be transmitted in advance.

20 Claims, 12 Drawing Sheets

(56) References Cited

U.S. PATENT DOCUMENTS

| | | |
|---|---|---|
| 8,719,336 B2 | 5/2014 | Douceur et al. |
| 9,094,667 B1 | 7/2015 | Hejl |
| 9,374,552 B2 | 6/2016 | Taraki et al. |
| 9,415,304 B2 | 8/2016 | Harp et al. |
| 9,694,281 B2 | 7/2017 | Garden |
| 9,700,789 B2 | 7/2017 | Cotter |
| 9,795,879 B2 | 10/2017 | Colenbrander |
| 10,127,082 B2 | 11/2018 | Hejl, Jr. et al. |
| 10,179,290 B2 | 1/2019 | Benedetto |
| 10,296,391 B2 | 5/2019 | Justice et al. |
| 10,315,113 B2 | 6/2019 | Marr et al. |
| 10,376,781 B2 | 8/2019 | Marr et al. |
| 10,403,022 B1 | 9/2019 | Silva et al. |
| 10,537,799 B1 | 1/2020 | Burke |
| 10,589,171 B1 | 3/2020 | Burke |
| 10,870,060 B2 | 12/2020 | Benedetto |
| 10,896,063 B2 | 1/2021 | Hejl, Jr. et al. |
| 10,918,938 B2 | 2/2021 | Karlsson |
| 10,979,744 B2 | 4/2021 | Mcauley et al. |
| 10,987,579 B1 | 4/2021 | Borovikov et al. |
| 11,213,745 B1 | 1/2022 | Burke |
| 11,369,873 B2 | 6/2022 | Smullen et al. |
| 2006/0105841 A1 | 5/2006 | Rom et al. |
| 2006/0159166 A1 | 7/2006 | Mohsenian |
| 2007/0030276 A1 | 2/2007 | MacInnis et al. |
| 2007/0143664 A1 | 6/2007 | Fang et al. |
| 2008/0303835 A1 | 12/2008 | Swift et al. |
| 2008/0303837 A1 | 12/2008 | Swift et al. |
| 2009/0002379 A1 | 1/2009 | Baeza et al. |
| 2009/0027383 A1 | 1/2009 | Bakalash et al. |
| 2009/0119736 A1 | 5/2009 | Perlman et al. |
| 2009/0135190 A1 | 5/2009 | Bakalash et al. |
| 2009/0275414 A1 | 11/2009 | Lee et al. |
| 2009/0318219 A1 | 12/2009 | Koustas et al. |
| 2010/0063992 A1 | 3/2010 | Ma et al. |
| 2010/0134494 A1* | 6/2010 | Lim ................ H04N 21/41407 345/426 |
| 2010/0166056 A1 | 7/2010 | Perlman et al. |
| 2010/0166064 A1 | 7/2010 | Perlman et al. |
| 2010/0255909 A1 | 10/2010 | McNamara |
| 2011/0126190 A1 | 5/2011 | Urbach |
| 2012/0004040 A1 | 1/2012 | Pereira et al. |
| 2012/0004042 A1 | 1/2012 | Perry et al. |
| 2012/0084789 A1 | 4/2012 | Iorio |
| 2013/0024545 A1 | 1/2013 | Sheppard |
| 2013/0123019 A1 | 5/2013 | Sullivan et al. |
| 2013/0203496 A1 | 8/2013 | Kruglick |
| 2013/0337916 A1 | 12/2013 | Saretto et al. |
| 2014/0184602 A1* | 7/2014 | Tuffreau ................ G06T 9/004 345/427 |
| 2014/0274368 A1 | 9/2014 | Cotter |
| 2014/0286438 A1 | 9/2014 | Apte |
| 2015/0062132 A1* | 3/2015 | Chann .................... A63F 13/60 345/473 |
| 2015/0133216 A1 | 5/2015 | Heinz, II |
| 2015/0221122 A1 | 8/2015 | Son et al. |
| 2016/0171765 A1 | 6/2016 | Mehr |
| 2016/0296840 A1 | 10/2016 | Kaewell et al. |
| 2016/0332081 A1 | 11/2016 | Marr et al. |
| 2017/0113135 A1 | 4/2017 | Marr et al. |
| 2018/0284871 A1 | 10/2018 | Surti et al. |
| 2018/0296912 A1 | 10/2018 | Hicks et al. |
| 2019/0088015 A1 | 3/2019 | Makinen et al. |
| 2019/0141374 A1 | 5/2019 | McAuley et al. |
| 2020/0027269 A1* | 1/2020 | Jiang ...................... G06T 19/20 |
| 2020/0197821 A1 | 6/2020 | Benedetto |
| 2020/0230499 A1 | 7/2020 | Buser et al. |
| 2020/0368616 A1* | 11/2020 | Delamont ............ A63F 13/213 |
| 2021/0236923 A1 | 8/2021 | Karlsson |
| 2021/0248012 A1 | 8/2021 | Hejl, Jr. et al. |
| 2022/0193541 A1 | 6/2022 | Burke |

\* cited by examiner

2.5D GRAPHICS RENDERING SYSTEM

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Field of the Disclosure

This disclosure relates to graphics processing, video processing, and video communications across a network.

Description of the Related Art

Graphics data for 3-dimensional ("3D") environments can be transmitted from one computer to another. The 3D graphics data can take time to prepare, and transmitting the data can require a high bandwidth and transfer rates.

SUMMARY

The systems, methods, and devices in this disclosure each have several innovative aspects, no single one of which is solely responsible for all of the desirable attributes disclosed herein. Details of the one or more implementations of the subject matter described in this specification are set forth in the accompanying drawings and the description below.

Some aspects feature a computing system comprising: a network communications interface configured to communicate via a network with a server that is generating a virtual 3D environment, a memory, and one or more processors. The one or more processors are configured to execute computer-readable instructions to perform steps comprising: receiving, from the server over the network, a 2D texture for an object in the virtual 3D environment; receiving first frame data comprising: an identification of the object, locations of vertexes of a 2D mesh for the object generated based at least in part on a field of view of a virtual character within the virtual 3D environment, and depth data for the object generated based at least in part on the field of view of the virtual character within the virtual 3D environment; storing the texture in the memory; mapping the texture onto the locations of the vertexes of the 2D mesh for the object; rasterizing a first frame of a video based at least in part on the depth data and the texture mapped onto the locations of the vertexes of the 2D mesh for the object; receiving second frame data comprising: the identification of the object, and updated locations of vertexes of the 2D mesh for the object; mapping the texture to the updated locations of the vertexes of the 2D mesh for the object; and rasterizing a second frame of the video based at least in part on the depth data and the texture mapped onto the updated locations of the vertexes of the 2D mesh for the object.

The computer system of the previous paragraph can include one, any combination of, or all of the following: the locations of the vertexes of the 2D mesh are locations of parts of a 3D object in the virtual 3D environment projected onto a 2D plane as seen from a viewpoint of the virtual character; the updated locations of vertexes of the 2D mesh for the object are formatted as 2D coordinate locations or changes to previous 2D coordinate locations; the one or more processors are further configured to perform steps comprising: executing a video game application, and communicating with a server running a host application for the video game application; the one or more processors are further configured to transmit at least one of user inputs or viewpoint data to the server, wherein the user inputs or viewpoint data are used to change a position or orientation of a viewpoint within the virtual 3D environment; the one or more processors are further configured to apply dynamic visual effects to the object. The computer system of the previous paragraph can additionally or alternatively feature that the one or more processors are further configured to perform steps comprising: receiving, from the server over the network, a second texture for a second object; storing the second texture into the memory; after receiving the second texture, receiving third frame data; rasterizing a third frame of the video based at least in part on the third frame data; receiving fourth frame data comprising: an identification of the second object, locations of vertexes of a 2D mesh for the second object, and second depth data for the second object; mapping the second texture onto the locations of the vertexes of the 2D mesh for the second object; and rasterizing a fourth frame of a video based at least in part on the second depth data and the second texture mapped onto the locations of the vertexes of the 2D mesh for the object.

Some aspects feature a method for streaming video of a 3D environment using 2.5D data, the method comprising: receiving, from a server over a network, a 2D texture for an object in a virtual 3D environment hosted on the server; storing the texture into a memory; receiving first frame data comprising: an identification of the object, locations of vertexes of a 2D mesh for the object, and depth data for the object; mapping the texture onto the locations of the vertexes of the 2D mesh for the object; rasterizing a first frame of a video based at least in part on the depth data and the texture mapped onto the locations of the vertexes of the 2D mesh for the object; receiving second frame data comprising: the identification of the object, and updated locations of vertexes of the 2D mesh for the object; mapping the texture to the updated locations of the vertexes of the 2D mesh for the object; and rasterizing a second frame of the video based at least in part on the depth data and the texture mapped onto the updated locations of the vertexes of the 2D mesh for the object.

The method of the previous paragraph can include one, any combination of, or all of: the locations of the vertexes of the 2D mesh are locations of parts of a 3D object in the virtual 3D environment projected onto a 2D plane as seen from a viewpoint; the updated locations of vertexes of the 2D mesh for the object are formatted as 2D coordinate locations or changes to previous 2D coordinate locations; executing a video game application; communicating with a server running a host application for the video game application; transmitting at least one of user inputs or viewpoint data to the server, wherein the user inputs or viewpoint data are used to change a viewpoint within the virtual 3D environment; receiving, from the server over the network, a second texture for a second object; storing the second texture into the memory; after receiving the second texture, receiving third frame data; rasterizing a third frame of the video based at least in part on the third frame data; receiving fourth frame data comprising: an identification of the second object, locations of vertexes of a 2D mesh for the second object, and second depth data for the second object; mapping the second texture onto the locations of the vertexes of the 2D mesh for the second object; and rasterizing a fourth frame of a video based at least in part on the second depth data and the second texture mapped onto the locations of the vertexes of the 2D mesh for the object; applying dynamic visual effects to the object.

Some aspects feature a computing system comprising: a network interface for communicating with a client over a network, and one or more processors. The one or more processors can be configured to execute computer readable instructions to perform steps comprising: hosting a video game application including a 3D environment, wherein objects in the 3D environment are assigned coordinates in 3D space; transmitting, to the client over the network, a 2D texture for an object in the 3D environment; calculating 2D vertexes of a 2D mesh of the object, wherein the 2D vertexes are positioned on a 2D plane as seen from a viewpoint in the 3D environment; transmitting, to the client over the network, the 2D vertexes of the object and depth data for the object; updating a state of the video game application; determining a second viewpoint in the 3D environment; calculating updated 2D vertexes of the 2D mesh of the object, wherein the updated 2D vertexes are positioned on a 2D plane as seen from the second viewpoint; and transmitting the updated 2D vertexes to the client over the network.

The computer system of the previous paragraph can include processors configured to execute computer readable instructions to perform steps further comprising one, any combination of, or all of: receiving user inputs from the client, and determining the second viewpoint based at least in part on the user inputs; determining a likelihood of a second object in the 3D environment coming into a field of view associated with the viewpoint, and transmitting, to the client, a 2D texture for the second object; progressively transmitting of the 2D texture for the second object to the client over the network while also transmitting data for a plurality of video frames; completing the progressive transmission of the 2D texture for the second object before the second object comes into the field of view; or transmitting a second 2D texture for the object to the client, wherein the second 2D texture has a higher level of detail than the 2D texture. The computer system of the previous paragraph can determine the likelihood based on at least one of: a future location of the viewpoint in the 3D environment; a current location of the viewpoint in the 3D environment; a location of a character of the video game application in the 3D environment; user inputs received from the client; or a position of the second object in the 3D environment.

DETAILED DESCRIPTION

Overview of Frame Communications Environment

Figure 1:
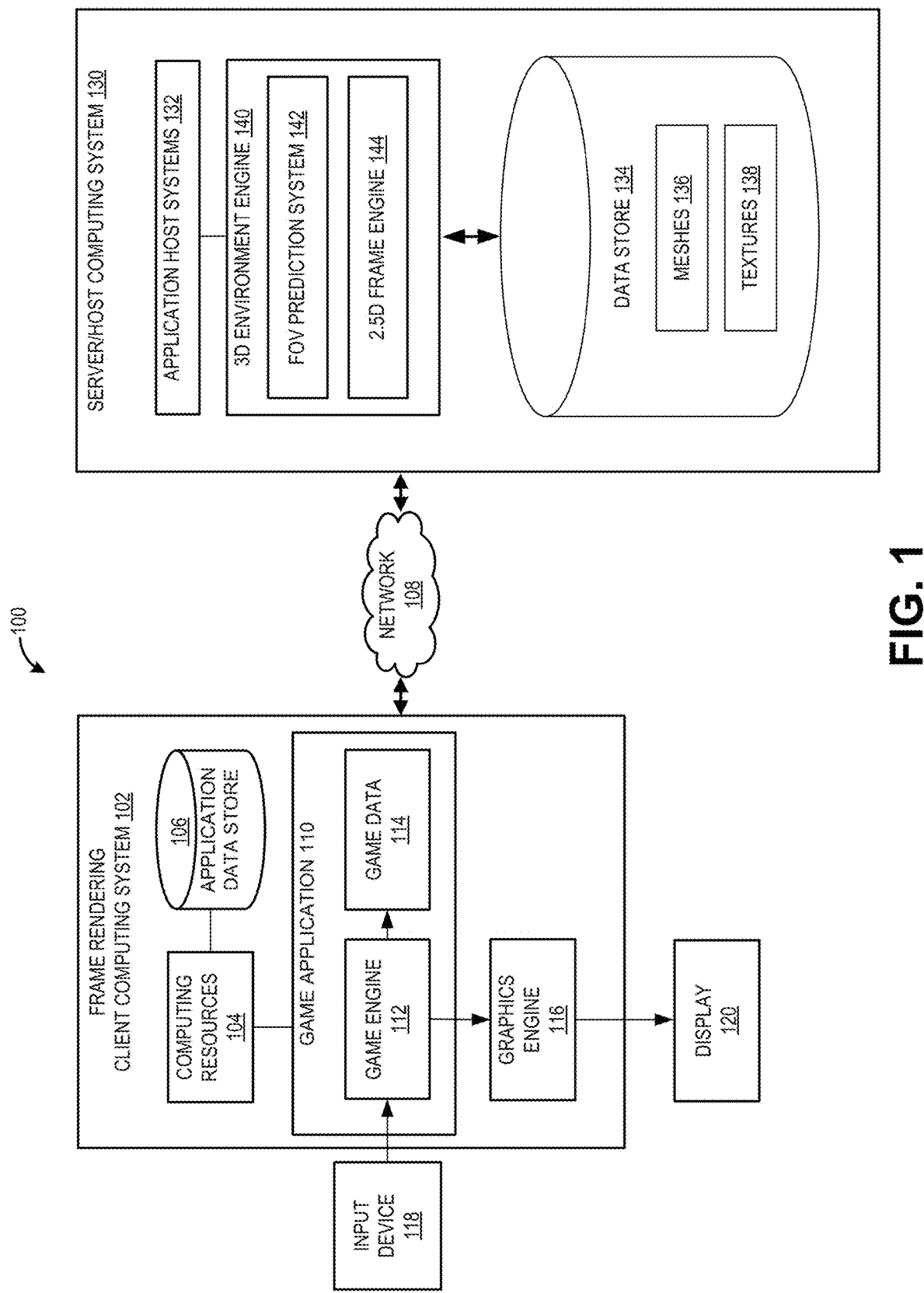
FIG. 1 shows a block diagram of a computing environment for graphics rendering system.

FIG. 1 shows a block diagram of a frame communications environment 100 for 2.5D frame communications over a network. A 2.5D frame includes data indicating positions of objects (or their 2D meshes) using 2D (x, y) coordinates and depth data for the objects. A 2.5D frame can also include texture data for one or more objects. Examples of 2.5D frames are discussed further below, and illustrated in the figures.

The computing environment 100 includes a first computing system 102 that may be referred to as a client, a network 108, and a second computing system 130 that may be referred to as a host or server. The server 130 includes, at least, an application host system 132, a data store 134, and a 3D environment system 140. To simplify discussion and not to limit the present disclosure, FIG. 1 illustrates a client computing system 102 and a server computing system 130, where the client computing system 102 can be used for rasterizing 2.5D frames and generating a output to display 120, and where the server computing system 130 can be used for hosting a 3D environment and generating 2.5D frame data. In various embodiments, multiple computing systems may be used in place of either the client computing system 102 or server computing system 130, and in some embodiments, the functionality of the client computing system 102 can be combined with the functionality of the server computing system 130 in a single computing system. The client computing system 102 may communicate via a network 108 with the server computing system 130. Although only one network 108 is illustrated, multiple distinct and/or distributed networks 108 may exist.

First Computing System

The client computing system 102 includes computing resources 104 and an application data store 106. The computing system 102 may include any type of computing system. For example, the computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), wireless mobile devices (for example, smart phones, personal digital assistants, tablets, or the like), and so forth. A more detailed description of an embodiment of a computing system 102 is described below with respect to FIG. 7.

Computing Resources

The computing resources 104 can include hardware resources such as one or more central processor units (CPUs), memory, graphics processor units (GPUs), and the like. In some embodiments, the computing resources can include a memory buffer for storing meshes and textures received from the server computing system 130. Textures for an object can be quickly read from the memory buffer to rasterize a frame for display in the display 120. When the memory buffer is full and new textures are received, the memory buffer can discard old textures to make room for new textures. The memory buffer can discard the least recently used textures, discard the textures according to a first-in-first-out protocol, discard textures associated with objects that have a least or low likelihood of coming into a field of view as determined by a FoV and motion prediction system 142, or any combination thereof. Computing resources are further discussed with respect to FIG. 8.

Game Application

The user computing system 102 can execute a game application 110 based on software code stored at least in part in the application data store 106. The code can be stored on a computer readable, non-transitory medium. The game application 110 may also be referred to as a videogame, a game, game code, and/or a game program. A game application 110 should be understood to include software code that a computing system 102 can use to provide a game for a user to play. A game application 110 may comprise software code that informs a computing system 102 of processor instructions to execute, but may also include data used in the playing of the game, such as data relating to constants, images, and other data structures. In the illustrated embodiment, the game application 110 includes a game engine 112 and game data 114.

In some embodiments, the client computing system 102 is capable of executing a game application 110, which may be stored and/or executed in a distributed environment. For example, the client computing system 102 may execute a portion of a game, and a network-based computing system may execute another portion of the game. For instance, the game may be a massively multiplayer online role-playing game (MMORPG) that includes a client portion executed by the client computing system 102 and a server portion executed by a server computing system 130.

In some embodiments, the client computing system 102 may include a frame streaming application in place of the game application 110. The frame streaming application can be based on software code stored in the application data store 106. The frame streaming application can be configured to receive, decode, and process frame data received from server computing system 130. The frame streaming application can use the graphics engine to, at least in part, rasterize a frame output for display on the display 120.

Game Engine

The game engine 112 can be configured to execute aspects of the operation of the game application 110. Execution of aspects of gameplay within a game application can be based, at least in part, on the user input received from an input device 118, on the game data 114, and on data received from the server computing system 130. The game data 114 can include game rules, prerecorded motion capture poses/paths, environmental settings, constraints, skeleton models, route information, game state information, and/or other game application information.

The game engine 112 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine 112 can receive the inputs from the input device 118 and determine in-game events, such as actions, jumps, runs, throws, attacks, and other events appropriate for the game application 110. During runtime operation, the game engine 112 can read in game data 114 to determine the appropriate in-game events.

In some examples, after the game engine 112 determines character events, the character events can be conveyed to a movement engine that can determine the appropriate motions the characters should make in response to the events and pass those motions on to a physics engine. In some embodiments, some or all of the gameplay execution performed by the game engine 112 can be performed on the server 130, such as with the 3D environment engine 140, in addition to or instead of executing the gameplay in the game engine.

Game Data

The game data 114 can include game rules, prerecorded videos, environmental settings, environmental objects, constraints, skeleton models, tutorial information, route information, and/or other game application information. At least a portion of the game data 114 can be stored in the application data store 106. In some embodiments, a portion of the game data 114 may be received and/or stored remotely. For example, a portion of the game data 114 can be stored in and received from the remote data store 134 of the server computing system 130. In such embodiments, game data may be received during runtime of the game application.

Frame Output

A scene within the video game can be conveyed to a rasterizer, which generates a new frame for display to the user through a display 120. Frames can be displayed through display 120 such as a screen of a monitor, TV, smartphone, or console. The frame output can also be displayed through accessories coupled to the computing system, such as screens on controllers, or projected through a projector.

The frame output can be rasterized in a 2.5D framework, where the frame output is generated based at least in part on a plurality of 2D meshes, a plurality of 2D textures applied to the plurality of 2D meshes, and depth data for a plurality of objects represented by the plurality of 2D meshes. The 2D textures, 2D meshes, and depth data for objects can be generated by, sent by, and received from the server computing system 130. The objects rasterized by the client computing system correspond to objects in a 3D environment in the server computing system.

Second Computing System

The server computing system 130 can include one or more application host systems 132, a graphics data store 134, and a 3D environment engine 140. In some embodiments, the one or more application host systems 132 can include one or more computing devices, such as servers and databases that may host and/or execute a portion of one or more instances of the game application 110.

Application Host System

In some embodiments, the host application system 132 may execute a hosting system for executing various aspects of a game environment. For example, in some embodiments, users can provide inputs through the input device 118, and the inputs are processed by the game application and communicated to the application host system 132, which simulates actions of a video game character controlled by the inputs as well as actions of other characters in the video game. Then, the application host systems 132 transmit data about interactions, the video game environment, and 2.5D graphics back to the game application 110.

In some embodiments, the game application 110 may be a single player game in which the application host system 132 may provide additional functionality when communicating with the instance of the game application 110. In some embodiments, the application host system 132 can provide a dedicated hosting service for hosting multiplayer game instances or facilitate the creation of game instances hosted by user computing devices. In some embodiments, the host application system 132 can provide a lobby or other environment for users to virtually interact with one another.

3D Environment Engine

The 3D environment engine 140 can simulate, process, and/or track actions, events, and interactions of objects in a 3D virtual environment. For example, the 3D environment engine can track the locations of objects in the 3D virtual environment and cause those objects to move, change positions, or spatially interact in response to inputs from one or more users. A 3D environment engine can include a physics engine to simulate motion, interactions between objects, collision detection, and other physics phenomena.

The 3D environment engine 140 can be configured to generate data indicating the appearance of objects in the 3D environment and the spatial relationships of the objects in the 3D environment. For example, a 3D environment can be oriented based on a coordinate system featuring an x, y, and z axis that are all orthogonal to each other. An object in the 3D environment can be drawn using a plurality of polygons that form the object's mesh, wherein the vertexes of the polygons are defined in terms of the x, y, and z coordinate system (e.g., as shown in 3D environment 300 of FIG. 3). Textures can be mapped over each of the polygons.

The 3D environment engine 140 can also include a field of view (FoV) and motion prediction system 142 and a 2.5D frame engine 144. The 2.5D frame engine 144 can be configured to generate 2D meshes, textures, and depth data for the objects in the 3D environment. The FoV and motion prediction 142 system can predict which objects may appear in a user's field of view based on the user's inputs, movement, available options for interaction, video game progression, and the like so that textures can be transmitted before an object featuring the texture appears in a FoV.

2.5D Frame Engine

Figure 3:
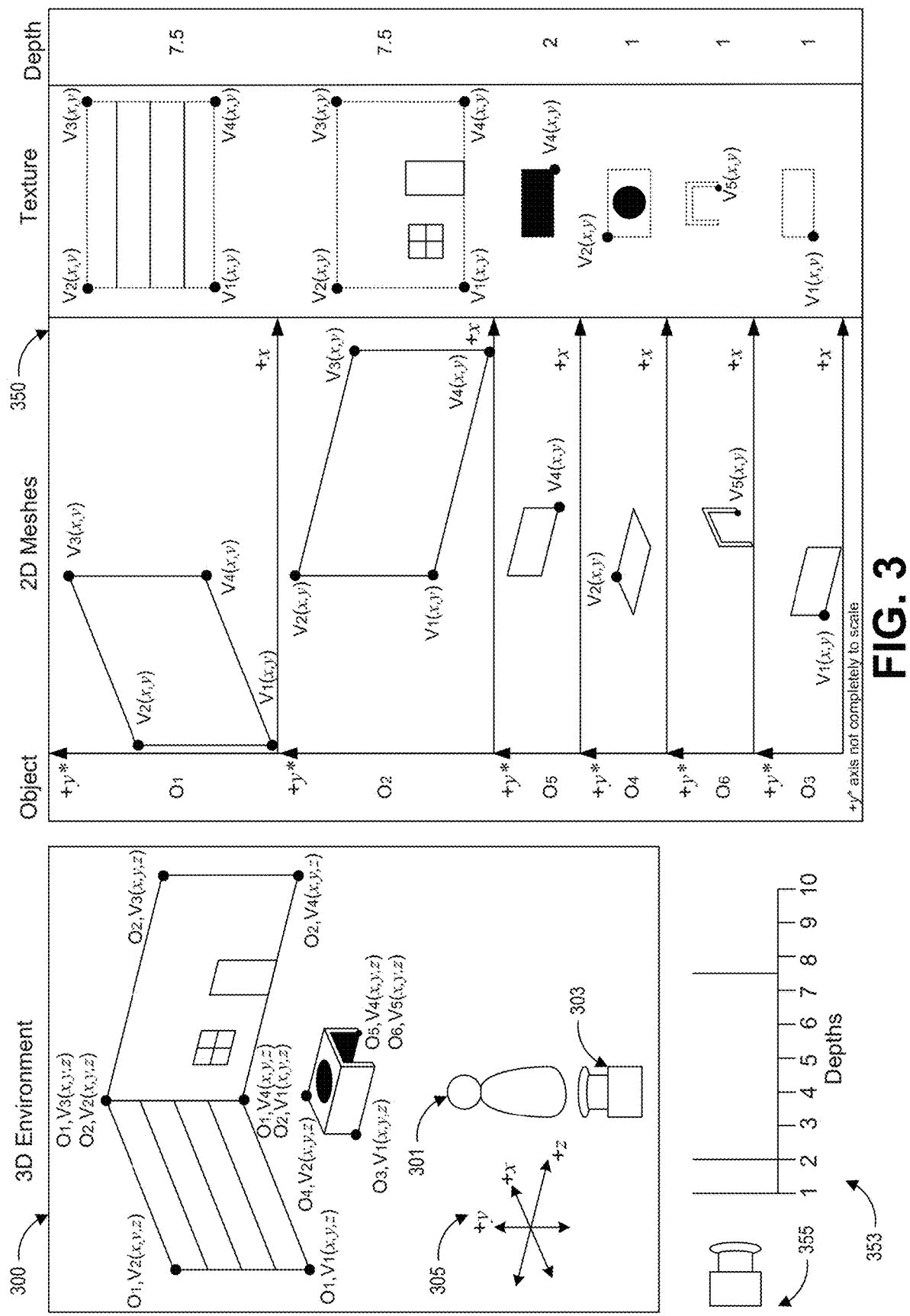
FIG. 3 shows an example 3D environment and visualization of corresponding 2.5D information.
Figure 4A:
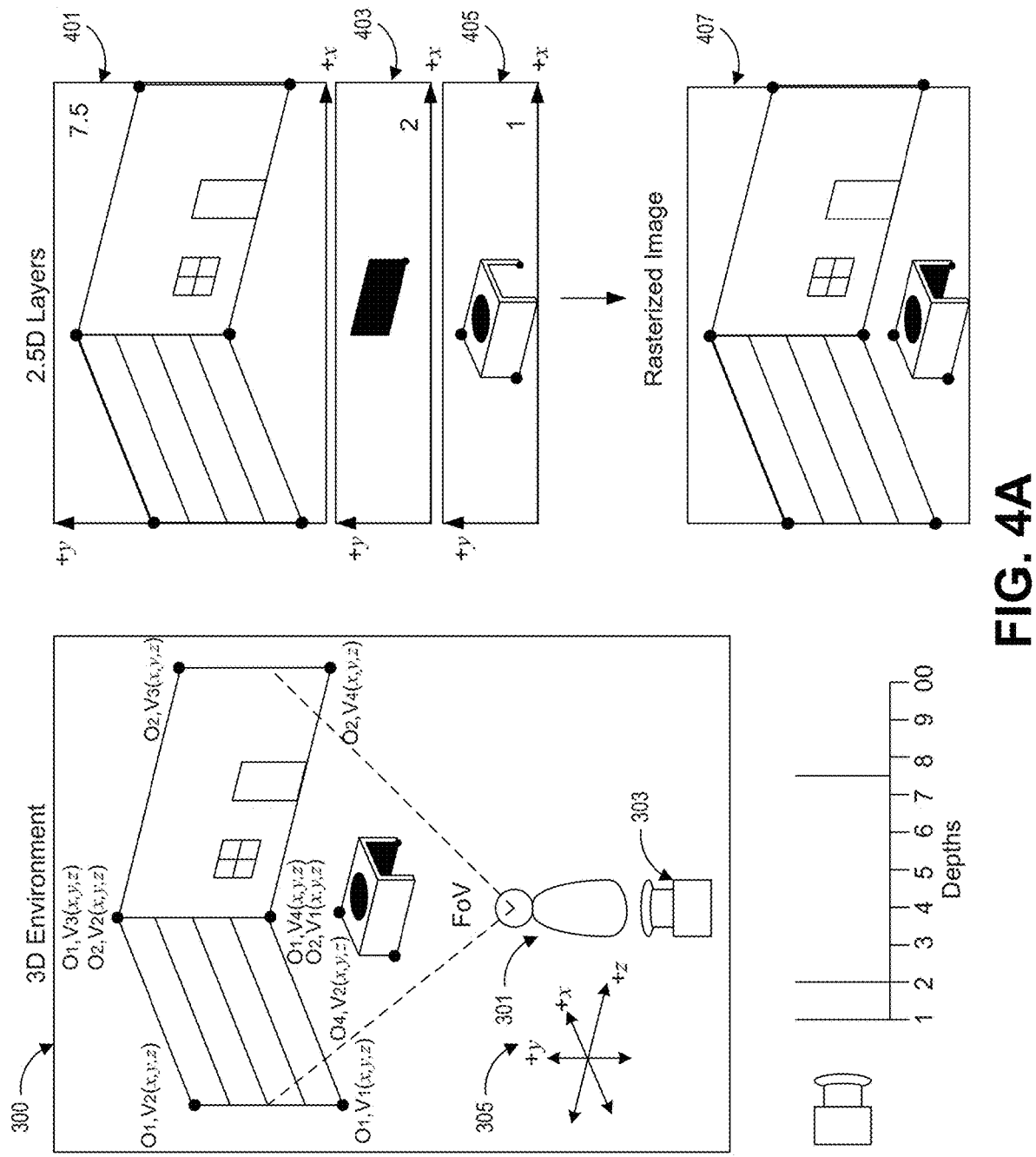
FIG. 4A shows a first example of rasterizing an image based on 2.5D information.

The 2.5D frame engine 144 is configured to generate a frame that is a 2.5D representation of the 3D environment. The frame generated using 2.5D has a plurality of 2D images positioned within the frame to generate the appearance of a 3D image. For each 3D object in the 3D environment, the 2.5D representation can include one or more 2D meshes, textures for the 2D meshes, and depth data (such as shown in FIG. 3, FIG. 4A, and FIG. 4C). A 3D mesh with vertexes defined by coordinates in an x, y, and z space can be converted into one or more 2D meshes with vertexes defined by coordinates in a 2D plane, such as the x, y, plane. The 2D mesh can be a projection of the 3D mesh onto the 2D plane. The 2D plane can also be given a layer ordering or depth so that some of the 2D planes can appear closer than or in front of other 2D planes. From a character's viewpoint in a virtual environment, the view of occluded objects that are defined in farther 2D planes can be blocked or obscured, at least partially, by objects in the closer 2D planes. For example, a vertex of an object mesh can have a first set of x, y, and z coordinates in a 3D environment with respect to a first coordinate reference. For a given viewpoint, the 2.5D frame engine 144 can calculate the object's mesh vertex as having x, y coordinates with a layer depth of with respect to a different coordinate reference.

Once generated, the 2.5D data can be transmitted or streamed from the server computing system 130 to the client computing system 102 for the client computing system 102 to rasterize. The client computing system can rasterize frames for display as frame output many times per second, such as 24 frames per second ("fps"), 30 fps, 60 fps, 100 fps, 120 fps, 144 fps, 200 fps, and the like. The 2.5D data can be transmitted for each frame and include: identifiers of objects within the frame, one or more 2D meshes for the objects within the frame, a 2D texture to apply to each mesh, and depth data. The 2D meshes can be provided as set coordinates in an x, y plane. For example, a vertex in a mesh may be identified by (1.1, 2.1). The 2D meshes can also be provided as coordinate changes for an object relative to the object's coordinate's in a previous frame. For example, if a vertex in a mesh for an object was previously located at (1.0, 2.3), the 2.5D data for the subsequent frame can indicate that the vertex changed by (+0.1, −0.2).

Field of View and Motion Prediction System

The FoV prediction and motion system 142 is configured to determine which objects might soon come within a FoV in the 3D environment. In cases where the 2.5D data is streamed to the client computing system 102, the FoV prediction system can be used to transmit meshes and/or textures of objects to the client before the objects are within a field of view, and the client computing system 102 can locally cache the meshes and/or textures before the objects are within the field of view. This way, the textures can be locally cached in advance and quickly loaded by the client computing system 102 on demand and rasterized for a next frame. When the FoV in the 3D environment changes to include the object within the FoV, the server computing system 130 can transmit the mesh coordinates for the object without re-sending the texture. The client computing system can read the locally cached texture and map the texture to the mesh coordinates in time to rasterize the next frame or otherwise with little delay.

Texture files can often be a large enough size such that if the texture is requested from by a client computing system 102 to render an object within a field of view, transmitting the texture from the server computing system 130 may take too long (such as longer than a time between frames) such that the texture is not rasterized in time for the next frame or is otherwise rasterized after a longer delay.

The FoV prediction system can be configured to predict that an object in the 3D environment may come within a FoV based on any of: an object's position within a threshold angle (such as a few degrees) of a FoV, the movement or trajectories of objects (such as an object in a trajectory that crosses the FoV), a threshold distance of the object (such as 100 meters or 500 meters and the like), current user inputs (for example, if a user is providing inputs to turn a FoV left, then objects to the left of the FoV are predicted to come into view), possible trajectories of a viewpoint (for example, if a viewpoint in a 3D environment can be moved left, right, up, down, forward, or backward, then the FoV prediction system can determine possible trajectories of the viewpoint and determine which objects are visible in FoV's associated with viewpoints along those trajectories), past inputs of users and a location of the viewpoint in the 3D environment (for example, if many users turn cause a FoV to turn right near a street corner in the 3D environment, then the FoV prediction system can predict that objects to the right of the street corner will come into view when the viewpoint approaches or arrives at the street corner), level design (for example, if a level is designed for a character to move from point A to point B within the 3D environment, then the FoV prediction system can predict that objects between point A and point B may progressively come within the field of view), scripted gameplay events (for example, if opponents are scripted to appear in a game at the 2 minute mark, then the FoV prediction system can determine that the opponent objects may become visible a few seconds before the 2 minute mark), positions of an obscured object (for example, an object in the 3D environment that is currently in front of a viewpoint but is obscured by a box may come into view if the viewpoint moves to the side of the box), the positions of other nearby characters in the 3D environment (for example, if a second character is behind a first character in the 3D environment, then the FoV prediction system can predict that the first character's FoV may soon turn around to look toward the second character and see objects near the second character), the positions of other sounds or moving objects in the 3D environment (for example, if a loud noise emanates from outside of a FoV, then the FoV prediction system can predict that the FoV may turn to look toward the source of the sound), the locations of objectives (for example, it can be predicted that a FoV in a 3D environment may turn toward the location of the objective), similar actions of other in-game actors or objects (such as where other characters in the 3D environment look when they move, act, behave, or position in the 3D environment), a size of the texture (for example, a very large texture for the horizon can be loaded farther in advance while small textures can be quickly transmitted 1-2 frames in advance), and other factors.

In some embodiments, the FoV prediction system can be used to predict whether a viewpoint will move closer to or farther from an object. If the viewpoint is predicted to move closer to an object, then texture with a higher level of detail for the object can be transmitted from the server computing system 130 to the client computing system 102. In some embodiments, a mipmap including a plurality of textures at varying levels of detail can be provided from the server computing system 130 to the client computing system 102. If the viewpoint is predicted to move farther from an object, then a texture with a lower level of detail for the object can be transmitted from the server computing system 130 to the client computing system 102. In some embodiments, higher and lower detailed textures can be transmitted from the server computing system 130 to the client computing system 102 for objects. The texture with the appropriate level of detail can be determined by the server computing system 130 based on the perspective and/or distance of the object as seen from a viewpoint within the 3D environment, and the server computing system 130 can update the client computing system 102 about which texture to apply to the object. In some embodiments, a client computing system 102 can select a texture having the highest level of detail from among a plurality of available textures for the mesh.

In some embodiments, the FoV prediction system can determine a likelihood that an object will come into a field of view. Textures for objects may be transmitted at different levels of detail to a client computing system 102 based on the likelihood that the object will come into the field of view. For example, it can be determined that a FoV in a 3D environment may look left or right at any moment such that first objects within 45 degrees to the left or right of a field of view have a high likelihood of coming into the field of view, and high level of detail textures for those objects can be sent to a client. It can be further determined that a FoV in a 3D environment may turn left or right at any moment beyond 45 degrees, and second objects between 45 degrees to 180 degrees to the left or right of the field of view have a lower likelihood of coming into the field of view, and for those second objects, textures with a lower level of detail can be sent to a client. Accordingly, the FoV prediction system can determine a score indicating a likelihood that a FoV will change to include an object, and a texture with a level of detail can be selected based at least in part on the score.

Graphics Data Store

The meshes 136, textures 138 for the 3D environment, and/or other 3D environment graphics data used in generating or rendering a 2.5D image can be stored in a data store 134. In some embodiments, the meshes 136 can be 3D meshes used to simulate, process, and/or track actions, events, and interactions of objects in a 3D virtual environment. In some embodiments, the meshes 136 can additionally or alternatively include 2D meshes of objects in the 3D environment. In some embodiments, the 2D meshes of objects can be dynamically determined based on a state of the 3D environment instead of storing the 2D meshes in the data store 134.

The textures 138 can include textures for the 3D meshes and/or textures for the 2D meshes. In some embodiments, the textures for the 2D meshes can be dynamically determined based on a state of the 3D environment instead of storing the 2D meshes in the graphics data store 134. In some embodiments, the textures 138 can be mipmaps for an object that includes a plurality of textures at varying levels of detail.

Network

The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Utility 2.5D information can be generated for a 3D environment on a server, transmitted to a client computing system 102, and rasterized by the client computing system 102 such that 3D-looking frames can be displayed by the client computing system 102. The bandwidth for the transmission of frames can be substantially reduced. In one example, a 2D video of the 3D environment may be about 25 megabytes, and 2.5D frames can stream at a bitrate of about 124 kilobytes per second after an initial transmission of about 8 megabytes. The streaming bitrate is substantially smaller than other video compression techniques, and in some embodiments, the bitrate can be about 50 times smaller than the bitrate for H.264 encoded video. The lower bitrate may enable transmission of higher resolution frames in 1080p, 4K resolution, and other resolutions to users on networks with limited bandwidth who would be otherwise unable to stream higher resolution frames. Updated frames from a server to a client can include updates to coordinates of mesh vertexes, which are relatively small compared to pixel information for textures. Textures can additionally be transmitted or streamed based on a predicted possibility of coming into a field of view, but in many frames featuring the same objects, the client can reuse locally cached textures. Accordingly, many or most frame updates can include updates to the coordinates of mesh vertexes without texture data such that the bitrate is relatively low.

Furthermore, many users may have computing systems, such as smartphones, tablets, smart TVs, laptops, or other computing devices that lack powerful 3D rendering engines. In some computing systems, a graphics engine 116 may be executed with lower end or integrated graphics hardware, and the computing system may be unable to map 3D textures into 3D meshes and rasterize frames at high frame rates and/or high resolutions. However, even those systems with lower end graphics hardware may be able to quickly rasterize the 2D textures and 2D meshes with added depth data at high frame rates and high resolutions.

For purposes of providing an overview, certain advantages have been described herein. It is to be understood that not necessarily all such advantages may be achieved in accordance with any particular embodiment. Thus, the various embodiments can be carried out in various manners that achieve or optimize one advantage or group of advantages as taught herein without necessarily achieving other advantages as may be taught or suggested herein.

Example Multi-User 2.5D Frame Communication System

Figure 2:
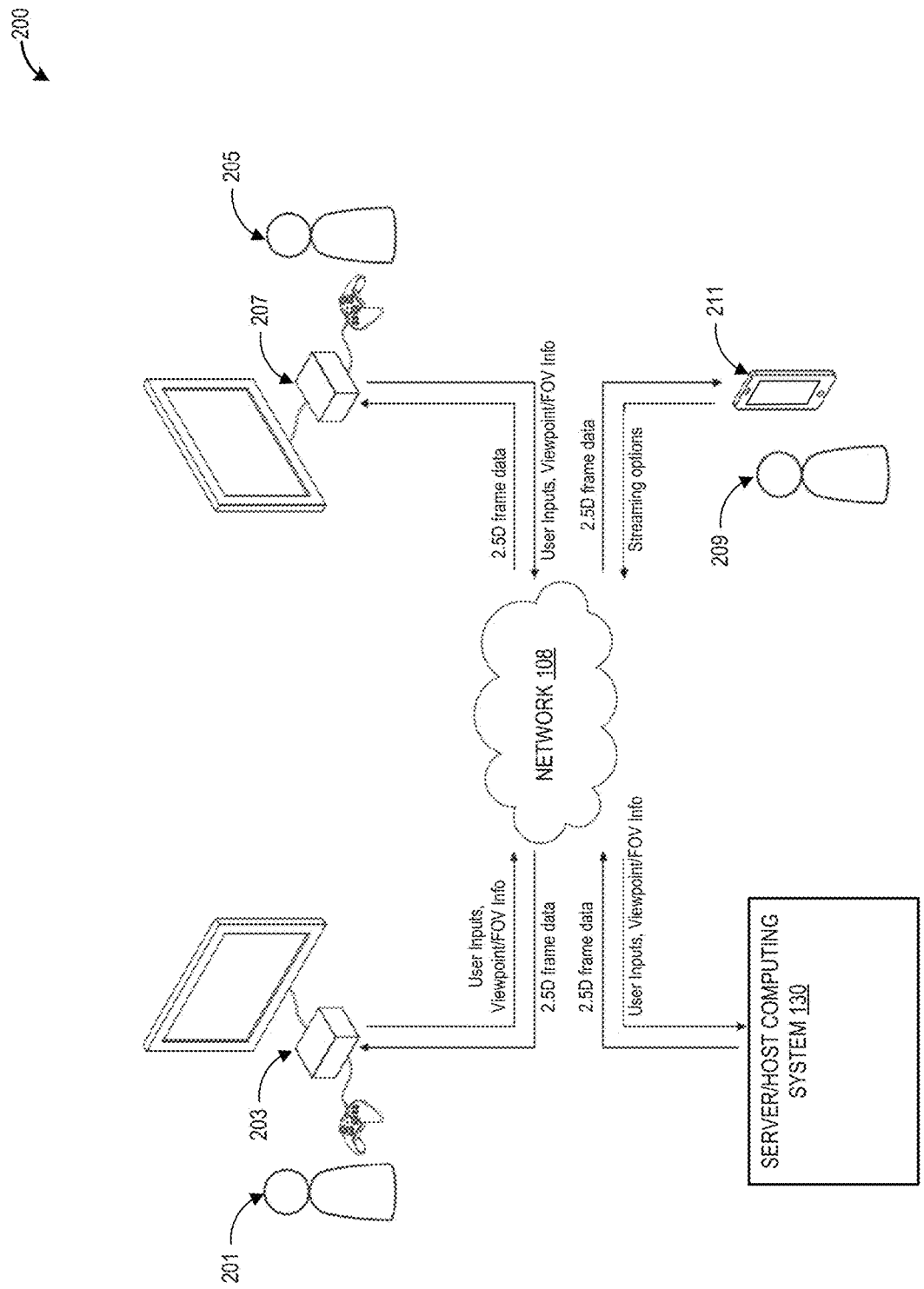
FIG. 2 shows a block diagram of a computing environment for a graphics rendering system with multiple viewers.

FIG. 2 shows a block diagram of a frame communications environment 200 for 2.5D frame communications over a network with multiple viewers. The frame communications environment includes a server or host computing system 130, a first user 201 interacting with a first computing system 203, a second user 205 interacting with a second computing system 207, a third user 209 viewing frames through a third computing system 211, and a network 108.

The server computing system 130 of FIG. 2 can be similar to the server computing system 130 as described in FIG. 1. The first computing system 203 and the second computing system 207 of FIG. 2 can be similar to the client computing system 102 of FIG. 1. The first user 201 can interact with the first computing system 203, such as by providing inputs through an input device. The second user 205 can interact with the second computing system 207 by providing inputs through an input device.

In some embodiments, the inputs provided by the first and second users 201, 205 can be used to control the viewpoint of a character in a 3D environment. For example, in video games, the first and second users 201, 205 can provide inputs to control respective characters in a 3D environment. The server computing system 130 can host the 3D environment, and objects in the 3D environment can move or interact according to the inputs provided by the first and second users 201, 205. Accordingly, viewpoints associated with objects in the 3D environment (such as the viewpoints from characters controlled by the users) can be moved according to the inputs. In some embodiments, the first computing system 203 and the second computing system 207 can determine how a character moves or how a FoV changes in accordance with respective user inputs, and the first and second computing systems 203, 207 can transmit the viewpoint or FoV information to the server computing system 130.

The server computing system 130 can generate a 2.5D representation of the 3D environment and transmit 2.5D frame streams via a network to the first and second computing systems 203, 207. The 2.5D frame stream can include one or more 2D meshes and 2D textures, as well as depth data for layers that include the 2D meshes and 2D textures. When received, the first and second computing systems 203, 207 can rasterize and display frames.

The 2.5D frame stream can also be transmitted via the network to the third computing system 211 configured to display frames to a third user 209. The third user 209 can use the third computing system 211 to watch frames of activities taking place in the 3D environment being hosted by the server computing system 130. The third user 209 can select and provide streaming options (such as resolution, which stream to watch, a character to follow from a variety of camera angles, and the like). Based on the streaming options, the server computing system 130 can generate a 2.5D frame stream and transmit the 2.5D frame stream to the third computing system 211. The third computing system 211 can rasterize frames based on the 2.5D frame streams. Accordingly, one or more computing systems can receive a 2.5D frame stream without providing inputs to control character movements or interactions in the 3D environment.

In some embodiments, 2.5D frames can be dynamically generated by the server computing system 130 multiple times per second. The dynamically generated 2.5D frames can be rasterized to provide a view of the 3D environment running on the server computing system 130 as state of the 3D environment changes. In some embodiments, the 2.5D frames can be part of a video, such as a video replay of video gameplay. For example, the first user 201 and second user 205 may virtually interact in the 3D environment in real time and receive dynamically generated 2.5D frames multiple times per second while the third user 209 watches a time-delayed video. The time delayed video can be, for example, the sequence of frames transmitted to the first user 201 or second user 205. As used herein, the term "video" is used to mean a specifically ordered sequence of specific frames. In some embodiments, the third user can receive a dynamic stream of 2.5D frames in real time.

Example 3D Environment and Corresponding 2.5D Information

FIG. 3 shows an example 3D environment 300 and visualization of corresponding 2.5D information. The 3D environment 300 can be simulated by the 3D environment engine 140 as shown in FIG. 1. The 2.5D representation of an image seen from a viewpoint within the 3D environment 300 can be generated by the 2.5D frame engine 144 discussed with respect to FIG. 1.

The 3D Environment

The 3D environment 300 shows an inside of a room with a table as seen by a character 301 in the 3D environment 300. The 3D environment 300 includes x, y, and z dimensions as shown by the coordinate system 305. In various embodiments, the coordinate system 305 can be fixed with respect to a stationary point or can be moved relative to a position of a character 301.

A camera 303 represents a viewpoint in the 3D environment 300 from which a 2.5D representation can be generated. In the illustrated example, the camera 303 represents the viewpoint of the character 301 and has the same field of view, but in various embodiments, a camera can be freely positioned in the environment apart from the character. The view of the 3D environment, as seen from the camera 303 (or character 301) can be converted into a 2.5D representation for transmission to and display by a client computing system. The camera 303 can be used to capture 2D projections of object textures, such as shown in the "Textures" column. In some embodiments, two or more cameras 303 can, from different viewpoints, capture non-occluded textures of objects within the 3D environment 300.

The 3D environment 300 includes two walls made of objects O1 and O2. Each wall object O1 and O2 includes a mesh that has a plurality of respective vertexes V1-V4 defined with x, y, and z coordinates in 3 dimensions with respect to the coordinate system 305. A striped texture is mapped on the wall O1, and a window and door texture are mapped on the second wall O2.

The 3D environment 300 also includes a table. The visible surfaces of the table include objects O3, O4, O5, and O6. Each of the objects O3-O6 includes a mesh that has a plurality of vertexes defined with x, y, and z, coordinates in 3 dimensions with respect to the coordinate system 305. To avoid over cluttering the drawing and to improve clarity, not all vertexes are labeled. The mesh O4 for the top surface of the table is mapped with a texture of a dark circle, and a mesh O5 for an interior panel O5 of the table is mapped with a black texture.

The texture mappings on corresponding meshes can be processed by one or more relatively powerful graphics processors such as dedicated graphics processing units, and the movements and interactions of objects within the 3D environment can be processed by relatively powerful general purpose computer processing units and/or physics processing units. The relatively powerful hardware can be included in a server computing system 130 shown in FIG. 1.

The 2.5D Information 2.5D information 350 can be generated for a viewpoint of a character (such as character 301) in the 3D environment. FIG. 3 includes a table with a row for each object, O1-O6, that shows a corresponding 2D mesh, 2D texture, and depth data. Each 2D mesh for an object can include vertexes that correspond to the vertexes of the corresponding mesh in the 3D environment. For example, for the wall O1, the vertexes V1-V4 defined in an x, y plane correspond to the vertexes in the 3D mesh defined by the x, y, and z coordinate in the system 305. However, the actual numerical values of the 2D and 3D coordinates can be different, even for corresponding vertexes. For example, the 3D coordinate for vertex V1 of a 3D mesh for object O1 can be (+17, 0, −5), while the 2D coordinates for vertex V1 of the 2D mesh for object O1 can be (1, 4). Within the 3D environment 300, a relative position of the reference x, y axis used to define the 2D coordinates can change as a viewpoint moves (such as if the character 301 moves).

Each row of the table of 2.5D information 350 also includes a 2D texture that can be mapped to each corresponding 2D mesh. For example, for object O1, the texture includes a plurality of horizontal lines. The texture for O1 is shown in a rectangle with vertexes V1-V4 that correspond to the vertexes V1-V4 of the 2D parallelogram mesh such that the texture can be mapped to the 2D mesh. In some embodiments, the texture can be represented in a parallelogram shape or other polygon with vertexes that correspond to a mesh. In some embodiments, the 2.5D texture information can also include additional data, such as shading information, transparency information, and the like. Although the example table shows a texture for each mesh taken from an orthogonal projection (such as from the viewpoint of the camera 303), in some embodiments, the 2D textures for objects can be generated from two or more different viewpoints (such as shown in FIG. 7B). In some embodiments, the 2D textures can be stored in a data store (such as data store 134 shown in FIG. 1). In some embodiments, the 2D textures can be the same textures applied to the 3D meshes. In some embodiments, textures mapped to the 3D meshes in the 3D environment 300 are also used as the textures for the corresponding 2D meshes. In some embodiments, 2D textures as seen from a viewpoint (such as from the viewpoint of the character 301) can be captured and used for mapping to the 2D meshes.

The table of 2.5D information 350 can also include depth data. The depth data can indicate an ordering of which 2D meshes obscure or overlap other 2D meshes. For example, as shown by diagram 353, the depths can be ordered from 1-10 (or according to any other ordering system) as seen from the viewpoint of camera 355. Objects at depth 1 will obscure objects at farther depths. As shown by the table of 2.5D information 350, objects O3, O4, and O6 can be displayed at depth 1; object O5 can be displayed at depth 2; and objects O1 and O2 can be displayed at depth 7.5. In some embodiments, each object can be assigned a unique depth. In some embodiments, a plurality of objects with meshes that do not overlap in the 2D plane can be at a same depth.

Rasterizing Images

FIG. 4A shows a first example of rasterizing an image based on 2.5D information for a FoV seen from a character 301 at a first location in a 3D environment 300. The FoV is indicated by dotted lines. The rasterization can be performed by a client computing system, such as client computing system 102 of FIG. 1.

The example shown in FIG. 4A is based on the 2.5D information 350 shown in FIG. 3. The textures of objects O1 and O2 are mapped on their 2D meshes positioned in a first layer 401 at a depth of 7.5. The texture of object O5 is mapped on its 2D mesh positioned in a second layer 403 at a depth of 2. The textures of objects O3, O4, and O6 are mapped on their 2D meshes positioned in third layer 405 at a depth of 5. The points of some vertexes are illustrated for reference but can be omitted during the rasterization process.

Accordingly, 2D textures are mapped onto 2D meshes in one or more layers. The layers 401, 403, and 405 can be rasterized for display as image 407 by displaying the 2D image from layer 405 in front of the 2D image from layer 403 and displaying the 2D image from layer 403 in front of the 2D image from layer 401. The points of some vertexes in image 407 are illustrated for reference but can be omitted during the rasterization process.

Figure 4B:
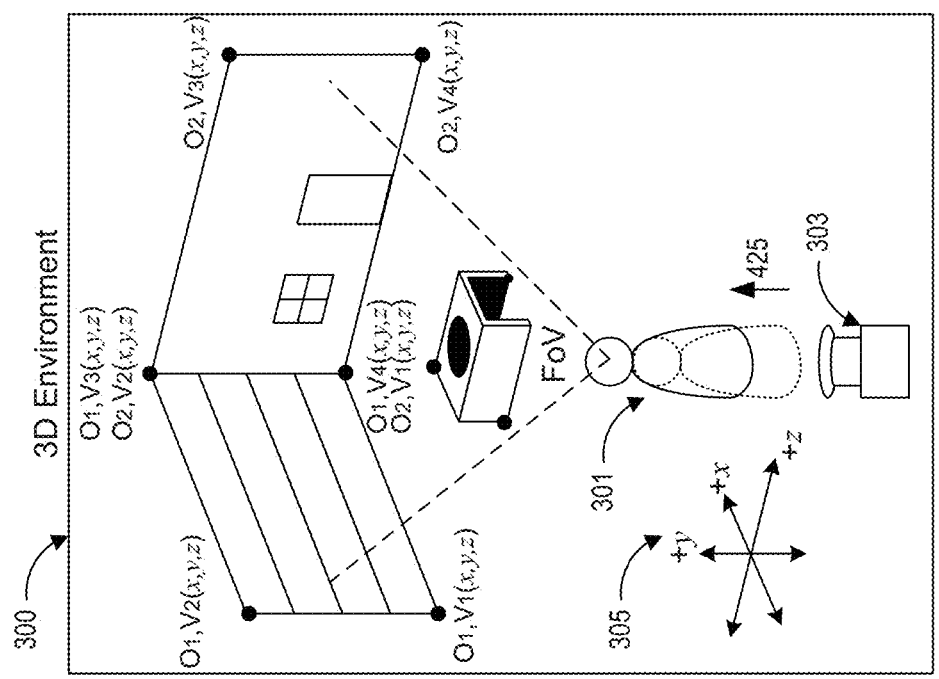
FIG. 4B shows an example of movement of a virtual character from an initial position to a new position within the 3D environment.
Figure 4C:
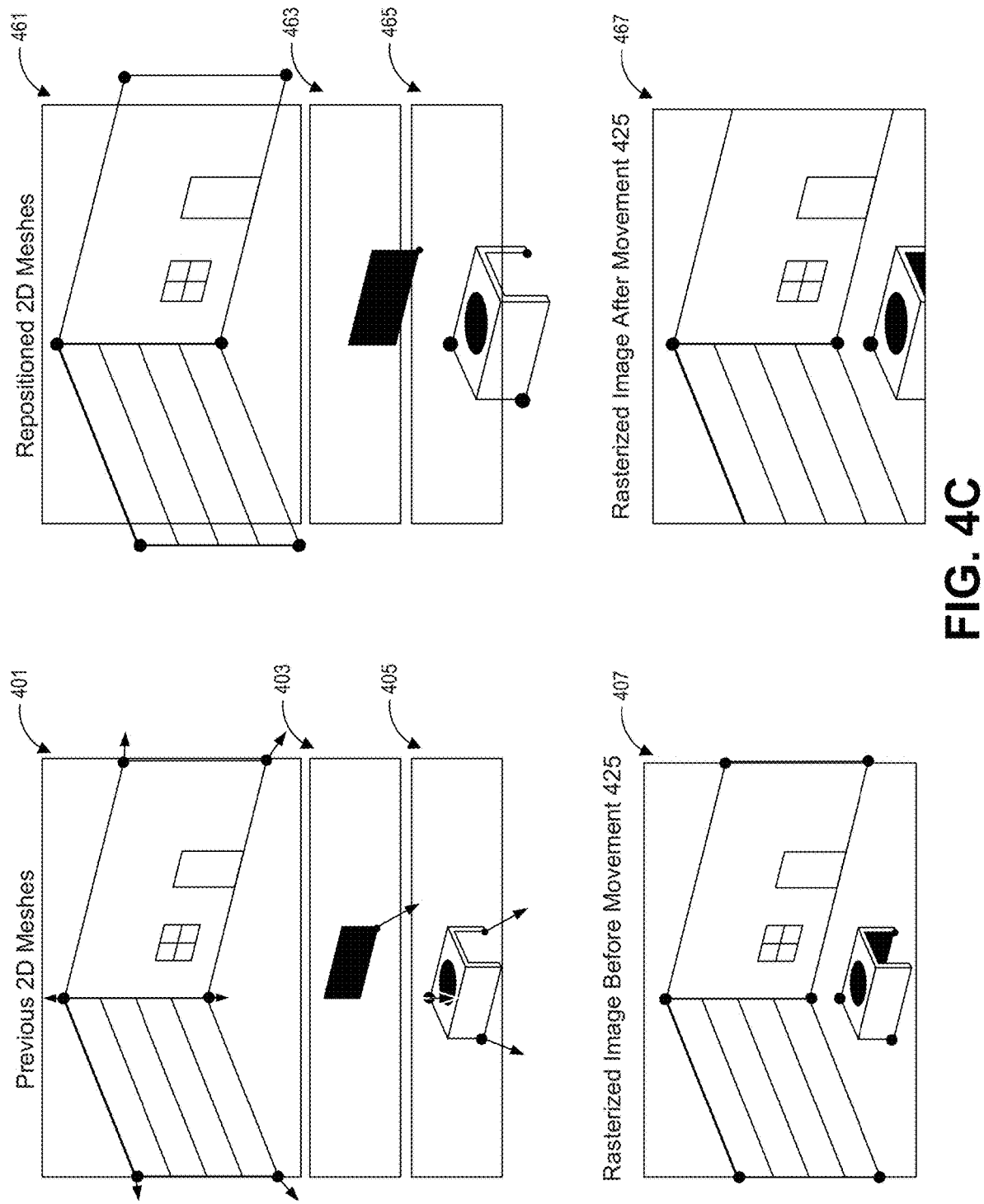
FIG. 4C shows an example of changes of 2D meshes in response to the movement of the character shown in FIG. 4B.

FIG. 4B shows the character 301 incrementally moving from an initial position (the position of the character in dotted lines) to a new position (the position of the character in solid lines) within the 3D environment 300 as indicated by arrow 425. Accordingly, the FoV of the character 301 changes such that the entireties of O1 and O2 are no longer visible within the FoV. By moving forward, the walls O1 and O2 will appear larger from the viewpoint of the character 301, and the desk will also appear larger and shifted downward from the viewpoint of the character 301.

FIG. 4C shows a visualization of how the previous 2D meshes (the 2.5D meshes shown in FIG. 4A) change into repositioned 2D meshes in response to the movement 425 of the character 301 as shown in FIG. 4B. A 2.5D frame engine (such as 2.5D frame engine 144 of FIG. 1) can determine how the vertexes of the meshes appear to change from the viewpoint of the character 301 in response to the movement 425.

On the left side of FIG. 4C, the layers 401, 403, and 405 from FIG. 4A are shown along with the previous rasterized image 407 from FIG. 4A. Arrows have been imposed onto the layers 401, 403, and 405 to show the changes to the x, y positions of some vertexes as determined by the 2.5D frame engine. Changes to the other vertexes can be determined but are omitted to prevent over cluttering.

On the right side of FIG. 4C, layers 461, 463, and 465 show how textures look after being mapped onto the 2D meshes with the changed vertexes. The layers 461, 463, and 465 can be rasterized to generate image 467. Textures outside of a displayable area can be omitted from rasterization.

Accordingly, for each incremental movement of a character in a 3D environment, the viewpoint of the character can be determined, and new positions of vertexes of 2D meshes of objects in the viewpoint can be determined, along with new depth data. The information about the new positions of the vertexes of 2D meshes can be transmitted from a server computing system to a client computing system. In some embodiments, the information about the new positions of vertexes of 2D meshes can be formatted as new x, y coordinates. For example, a new position of vertex V1 of object O1 can be formatted as: "O1,V1,−1,0" to indicate that the new vertex positioned is at x, y coordinates of (−1, 0). In some embodiments, the information about the new positions of vertexes of 2D meshes can be formatted as changes relative to a previous location of the vertexes. For example, if vertex V1 of object O1 was located at x, y coordinates of (1, 4) and appear to change to x, y coordinates of (−1, 0) in response to the movement 425 of a character 301, then the information can be formatted as "O1,V1,−2,−4." Depth data of meshes can similarly be updated with new depth orderings or changes to previous depth orderings.

The new positions of vertexes of 2D meshes can be determined by a server computing system many times per second, such as 24, 30, 60, 100, 120, 144, or 200 times per second or at other similar rates, or as fast as or about as fast as framerates on a client computing system. The new positions of the vertexes can be determined whenever a viewpoint or FoV changes, such as by panning left or right or looking up or down, whenever the character 301 moves, or whenever objects within a field of view move. When updated quickly enough, movements of objects in the 3D environment can be captured as small, incremental changes to the positions of vertexes of 2D meshes that, when rasterized at many frames per second, can appear as a smooth video of a 3D environment.

A client can, upon receiving updates to positions of vertexes of 2D meshes, rasterize a next frame. If textures are locally cached by the client, then the client can rasterize frames upon receiving updates to the positions of vertexes of 2D meshes without receiving texture data or any actual images. The information received for each frame (the updates to vertexes of 2D meshes) can be relatively small in size and sparse compared to the information received for each frame in other encoding schemes, such as H.264, and the bitrate can be substantially smaller.

The examples in FIGS. 4A, 4B, and 4C show a rasterized 2D image that is an isometric view of the 3D environment 300 as seen from a viewpoint, such as the viewpoint of a character 301. In some embodiments, the view of the 3D environment can alternatively be converted into 2D meshes and textures as seen from a first-person view and rasterized to show a first-person view of the 3D environment. In some embodiments, the view of the 3D environment can be converted into any other type of view for rasterization.

Figure 4D:
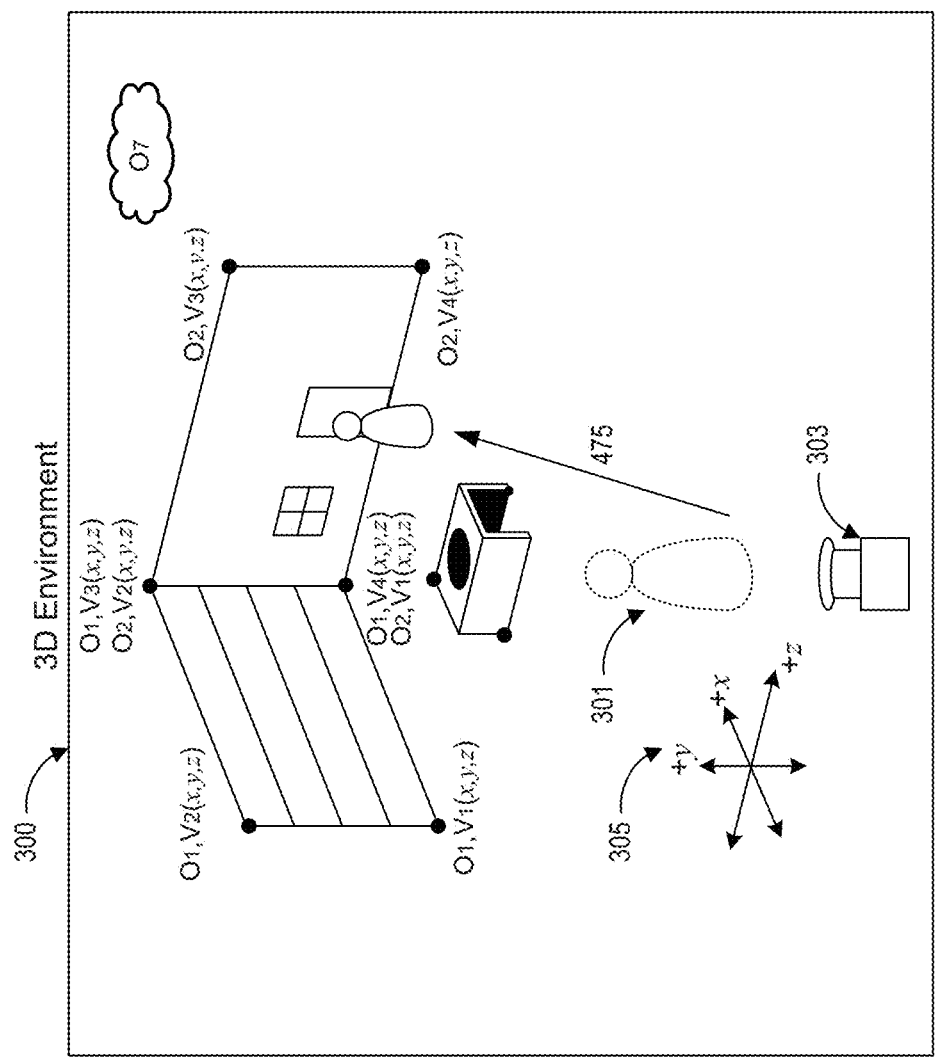
FIG. 4D shows an extended view of 3D environment.

FIG. 4D shows an extended view of 3D environment 300 such that object O7 (a cloud) is included in the environment. The character in the environment moves as shown by arrow 475 such that the character is in front of a door in the wall. However, the opaque wall and door prevent the cloud from being seen. Accordingly, the vertexes of the cloud object O7 and a texture for the cloud object O7 are unnecessary for rasterizing a frame of the 3D environment as seen from the viewpoint of the character 301.

A user can control the character 301 by pressing a button to open the door, causing the cloud to come into view. An example FoV prediction system can determine, based in part on the proximity of the character 301 to the door, the ability of the user to open the door by pressing a button, and the position of the cloud relative to the field of view of the character, that a texture of the cloud object O7 should be transmitted to a client computing system. Accordingly, the texture for the cloud object O7 can be transmitted over several frames before or transmitted several seconds before the cloud is visible from the viewpoint of the character 301. When a user provides an input to open the door in the 3D environment such that the cloud object O7 is visible from the viewpoint of the character 301, the 2.5D frame engine can quickly transmit the vertex positions of the 2D mesh of the cloud object without transmitting the texture for the cloud object O7. A client receiving the vertex positions can map the previously received cloud textures on the vertex positions of the 2D mesh of the cloud.

Example Client Processing of 2.5D Frame Data

Figure 5:
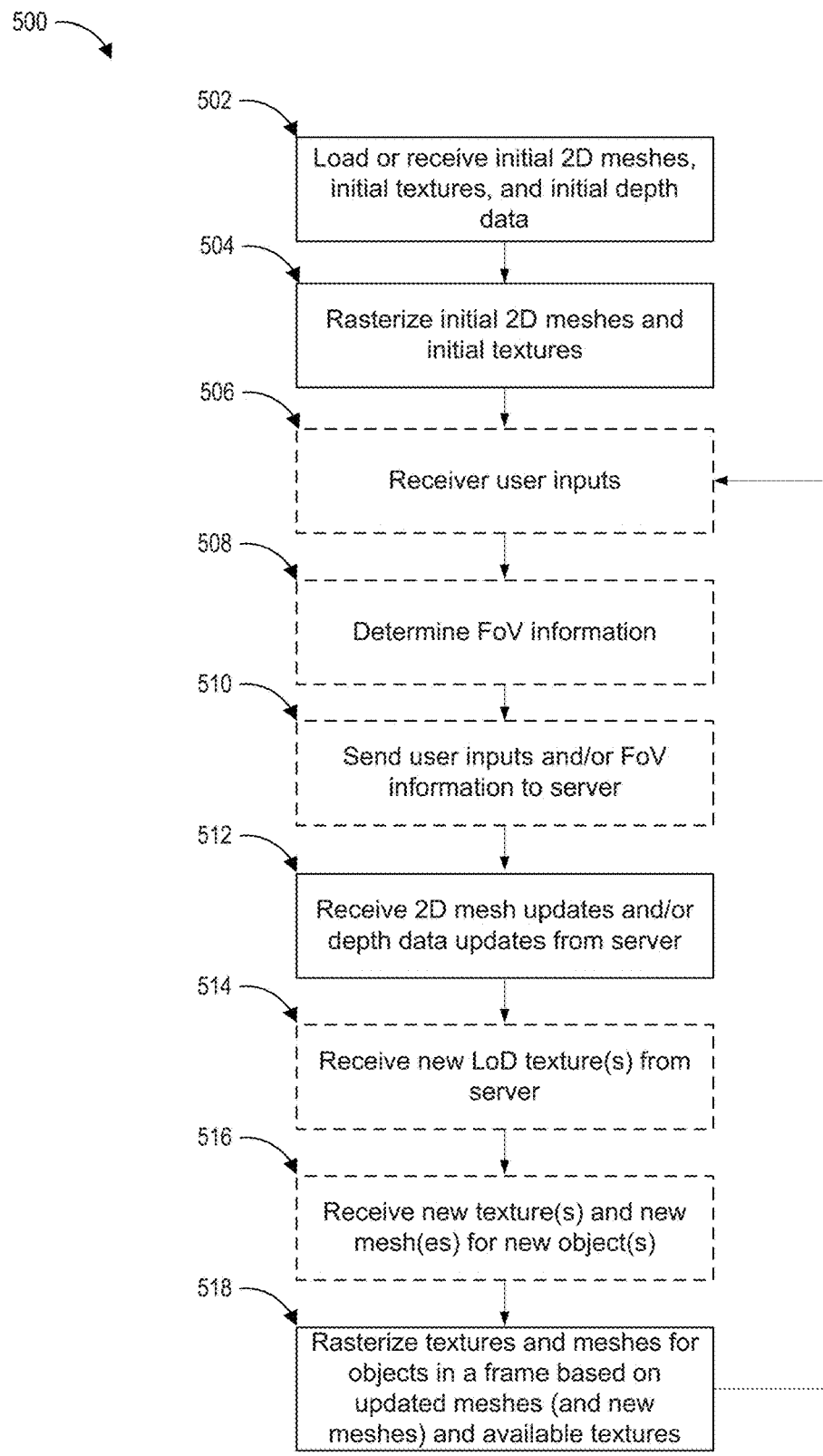
FIG. 5 shows a block diagram of an example process for rasterizing videos using 2.5D data.

FIG. 5 shows a block diagram 500 of an example process for rasterizing frames using 2.5D data. The process can be performed, for example, by a client computing system 102 shown in FIG. 1.

At block 502, a client computing system can load or receive initial 2D meshes, initial textures, and initial depth data. This can occur, for example, while an application is loading or before a portion of a frame is displayed. The initial 2D meshes and textures can be the 2D meshes and textures of objects that are within or likely to come within an initial field of view of a character in a 3D environment. Either or both of the initial meshes and/or initial textures may be loaded from a local data store of the client computing system or received from a server computing system over a network. Receiving or loading the 2D meshes can include receiving or loading vertexes of the 2D meshes and depth data about the 2D mesh. The 2D meshes can correspond to 3D meshes of objects in a 3D environment. The vertexes of the 2D meshes can be the projections of the 3D meshes onto a 2D plane as seen from a viewpoint within the 3D environment. The depth data can indicate an ordering of which objects obscure other objects as seen from the viewpoint within the 3D environment.

At block 504, the client computing system can map the initial textures on the initial 2D meshes. Each mapped texture can then be rasterized using the initial depth data such that one or more textures are obscured by other textures according to a depth ordering. The rasterized image can be displayed as a first frame.

At block 506, the client computing system can receive user inputs. The user inputs can be used to control a character in the 3D environment, change a viewpoint in the 3D environment, change a FoV in the 3D environment, or cause interactions between objects in the 3D environment.

At block 508, the client computing system can determine FoV information. For example, in some embodiments, the client computing system may receive a "move left" user input at block 506, and in response, the client computing system can determine a different FoV to be displayed. For example, the different FoV can be positioned slightly to the left of a current viewpoint in the 3D environment, or the different FoV can be a viewpoint from a different character in the 3D environment. FoV information can include data about a viewpoint within the 3D environment from which the FoV originates. In some embodiments, a client computing system can transmit user inputs, and the server computing system can determine how the FoV changes.

At block 510, the user inputs and/or FoV information can be transmitted from the client computing system to the server computing system via the network. The client computing system can update the 3D environment based on the user inputs. The server computing system can then transmit updated coordinates for vertexes of 2D meshes, depth data, and/or textures back to the client computing system via the network. In some embodiments, such as in cases of people passively watching streams of video gameplay, blocks 506, 508, and/or 510 can be skipped.

At block 512, the client computing system can receive 2D mesh updates and/or depth data updates from the server computing system. The updates can identify objects to be rasterized in a next video frame, and the updates can include the textures for the objects, positions of vertexes of meshes of the objects, and/or changes to the objects. The 2D mesh updates can include changed 2D coordinates for one or more vertexes of the 2D meshes. The depth data can indicate changes in the depth ordering of objects as seen from a viewpoint in the 3D environment. The updates can be formatted as a list of tuples such as i,j,x,y,z where "i" is an object or mesh identifier, "j" is an identifier of a vertex of the mesh, "x" and "y" are 2D coordinates or changes to 2D coordinates, and "z" is a depth ordering or change to a depth ordering. The updates can be compressed using various compression schemes when transmitted from the server computing system to the client computing system.

At block 514, the client computing system can also receive a texture at a new level of detail from the server computing system. The texture can be associated with a mesh or object that was previously received by, loaded by, or rasterized by the client computing system. For example, as a character in a 3D environment approaches a table, a higher resolution texture for the surface of the table can be transmitted over a network to the client computing system. The texture at the new level of detail can be progressively transmitted. For example, blocks 512 and 518 can occur a plurality of times before all of the textures are completely received at block 514.

At block 516, the client computing system can also receive new textures(s) and new mesh(es) for new object(s) from the server computing system. The new texture(s), mesh(es), and new object(s) can be transmitted by the server computing system in response to a prediction by a FoV prediction system that the new object(s) are likely to soon come into a FoV in the 3D environment. For example, FIG. 4D shows that a cloud object O7 might soon come into a FoV of the character 301. The new texture(s) and mesh(es) for the new object(s) can be progressively transmitted over a network from a server computing system to a client computing system. For example, blocks 512 and 518 can occur a plurality of times before the texture is completely transmitted at block 514. The progressive transmission can complete before the new object is visible in a FoV in the 3D environment such that when the new object is included in a frame, the client computing system can access the new texture and new meshes from a local memory for mapping the new texture on the new meshes.

At block 518, the client computing system can rasterize textures and meshes for objects to be displayed as a next frame. The rasterized frame can correspond to a FoV as seen from a viewpoint within a 3D environment hosted in a server computing system. Rasterizing the next frame can include applying dynamic effects, such as dynamic lighting, particle processing, and the like. As part of rasterizing the next frame, the client computing system can map locally available textures onto meshes of objects included in the frame using a latest available set of vertexes for the meshes. The locally available texture could have been previously transmitted to the client computing system and/or used for rasterizing previous frames. By re-using locally stored textures instead of re-receiving the same texture for subsequent frames, communication bandwidth can be reduced. In some embodiments, a highest detailed texture locally available to the client computing system can be used. In some embodiments, a texture for an object can be selected based in part on a viewing distance and/or size of the object. In some embodiments, the server computing system can identify a texture at a particular level of detail for the client computing system to map onto a mesh. Once rasterized, the next frame can be displayed through a display device. Block 518 can optionally proceed to block 506, 508, and 510, where additional user inputs can be received and/or proceed to block 512 (such as in cases where people are passively watching a stream of video gameplay).

Example Server Transmission of 2.5D Frame Data

Figure 6:
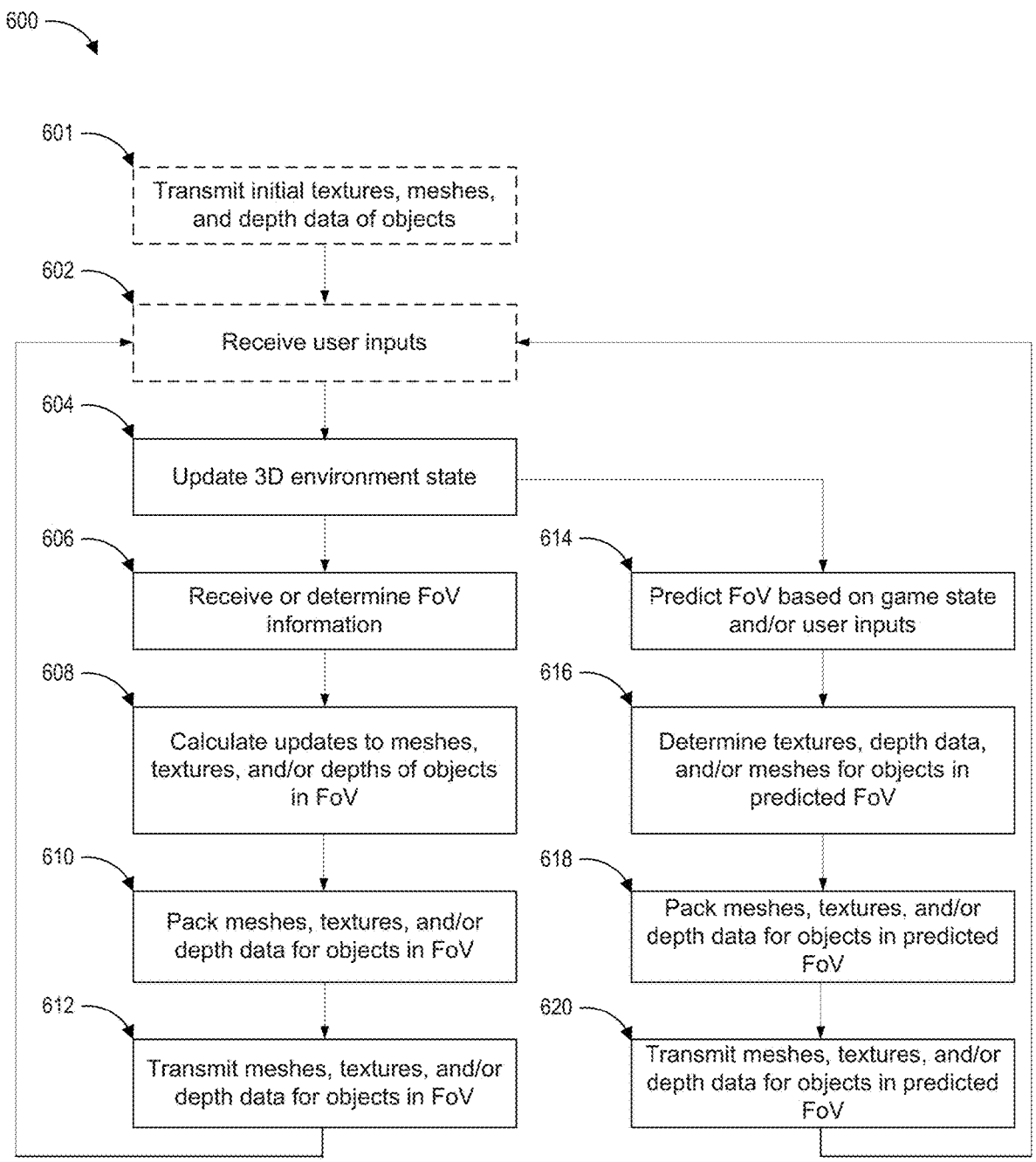
FIG. 6 shows a block diagram of an example process for rasterizing videos using 2.5D data.

FIG. 6 shows a block diagram 600 of an example process for rasterizing frames using 2.5D data. The process can be performed, for example, by a server computing system 130 shown in FIG. 1 that is hosting a 3D environment.

At block 601, initial textures, meshes, and depth data of objects can be transmitted to a client system. The initial transmission can include a relatively larger quantity of textures for the client computing system to buffer in a local cache such that subsequent transmissions for next frames can include vertex and/or depth information without the buffered textures.

At block 602, the server computing system can receive user inputs if transmitted by a client computing system. The user inputs can include presses of buttons or directional controls to indicate movements or actions in the 3D environment, change a FoV of a character (such as rotating the FoV to the left or right or moving the FoV forward or backward), and/or to change a selected viewpoint in the 3D environment (such as changing to a perspective of a different character).

At block 604, the server computing system can update a state of the 3D environment. This can include, for example, causing events to progress in time in the 3D environment and to execute interactions between objects in the 3D environment. The updates can be based at least in part on inputs received from one or more users controlling various characters within the 3D environment and interacting with objects in the 3D environment.

At block 606, the server computing system can receive or determine FoV information. If viewpoint information was transmitted from the client computing system, then the FoV information can be received by the server computing system. Otherwise, the FoV information can be determined by the server computing system. The FoV information can include a viewpoint and direction from which the FoV extends.

At block 608, updates to meshes, textures, and/or depths of objects in the FoV as seen from the viewpoint can be calculated such that a 2.5D representation of a view of the 3D environment can be determined. The updates to meshes can include 2D positions of the vertexes as seen in a FoV from the viewpoint. The 2D positions of the vertexes can be calculated by translating 3D coordinates from the 3D environment into 2D coordinates in a frame as seen from a viewpoint. Accordingly, vertex positions of different objects can be defined with respect to a common x, y reference based on the viewpoint. The vertexes of the meshes can be determined and indicated as 2D coordinates or as changes to the 2D coordinates of the vertexes in comparison to the 2D coordinates of the vertexes from a previous time, previous viewpoint, and/or previous frame. The textures can include textures of meshes of objects visible in the FoV. In some embodiments, textures of varying levels of detail can be determined based on a proximity to an object and a size of the object. The depth data for an object can indicate an order of which textures may obscure other textures.

At block 610, the meshes, textures, and/or depths of objects in the FoV can be packed as 2.5D data for rendering as a next frame. Packing the meshes, textures, and/or depths of objects can include formatting and/or encoding the data for transmission over a network. For example, data for meshes and depths of objects can be formatted in the i,j,x,y,z format described with respect to block 512 of FIG. 5 or formatted according as any other data structure.

At block 610, textures can be transmitted as images or incremental updates to previous textures, and textures can be transmitted using wavelet-based compression or mipmap encoding. Textures previously transmitted to a client computing system and/or textures that are locally available to the client computing system can be omitted from the packed 2.5D data. Omitting such redundant texture information can substantially reduce the size of transmissions such that a smaller bitrate can be used to stream frame data. For some sequences of frames, the textures can be omitted in a majority of instances.

At block 612, the meshes, textures, and/or depth data for objects in the FoV can be transmitted, over a network, to a client computing system for rendering as a next frame. Block 612 can proceed back to block 602. The transmission at block 612 can occur at least once for each frame to be rasterized by a client computing system.

At block 614, a FoV can be predicted based at least in part on the state of the game and/or user inputs. The FoV can be used to determine new objects that may soon come into view in the 3D environment and pre-transmit the textures for those new objects to a client computing system before the new objects come into view. As discussed above, the FoV prediction system can be configured to predict that an object in the 3D environment may come within a FoV based on any of: an object's position within a threshold angle (such as a few degrees) of a FoV, a threshold distance of the object (such as 100 meters or 500 meters and the like), current user inputs (for example, if a user is providing inputs to turn a FoV left, then objects to the left of the FoV are predicted to come into view), possible trajectories of a viewpoint (for example, if a viewpoint in a 3D environment can be moved left, right, or move forward, then the FoV prediction system can determine possible trajectories of the viewpoint and determine which objects are visible in FoV's associated with viewpoints along those trajectories), past inputs of users and a location of the viewpoint in the 3D environment (for example, if many users turn cause a FoV to turn right near a street corner in the 3D environment, then the FoV prediction system can predict that objects to the right of the street corner will come into view when the viewpoint approaches or arrives at the street corner), level design (for example, if a level is designed for a character to move from point A to point B within the 3D environment, then the FoV prediction system can predict that objects between point A and point B may progressively come within the field of view), scripted gameplay events (for example, if opponents are scripted to appear in a game at the 2 minute mark, then the FoV prediction system can determine that the opponent objects may become visible a few seconds before the 2 minute mark), positions of obscured object (for example, an object in the 3D environment that is currently in front of a viewpoint but is obscured by a box may come into view if the viewpoint moves to the side of the box), the positions of other nearby characters in the 3D environment (for example, if a second character is behind a first character in the 3D environment, then the FoV prediction system can predict that the first character's FoV may soon turn around to look toward the second character and see objects near the second character), the positions of other sounds or moving objects in the 3D environment (for example, if a loud noise emanates from outside of a FoV, then the FoV prediction system can predict that the FoV may turn to look toward the source of the sound), the locations of objectives (for example, it can be predicted that a FoV in a 3D environment may turn toward the location of the objective), similar actions of other in-game actors or objects (such as where other characters in the 3D environment look when they move, act, behave, or position in the 3D environment), a size of the texture (for example, a very large texture for the horizon can be loaded farther in advance while small textures can be quickly transmitted 1-2 frames in advance), and other factors.

At block 616, the server can determine which textures, depth data, and meshes for objects in a predicted FoV are not locally cached by a client computing system. For example, the textures, depth data, and meshes might not have been transmitted to the client computing system yet to be locally cached. As another example, the textures, depth data, and meshes may have been previously transmitted to a memory buffer of the client computing system but subsequently evicted after a period of time. The textures can be textures for objects not yet within a FoV. The textures can also be textures at higher or lower levels of detail. For example, it can be determined that a texture at a higher level of detail of an object currently within a field of view should be transmitted after predicting that a field of view will move closer to the object.

At block 618, the meshes, textures, and/or depth data for objects in the predicted FoV can be packed and/or encoded. Packing the meshes, textures, and/or depths of objects can include formatting and/or encoding the data for transmission over a network. The packed data format can be the same or different from the data format in block 610.

At block 620, the meshes, textures, and/or depth data for objects in the predicted FoV can be transmitted, over a network, to a client computing system for rendering in later frames. Block 620 can proceed back to block 602. The transmission at block 620 can be transmitted progressively using leftover bandwidth after transmitting the data in block 612. The transmission of block 620 can span a plurality of frames. The transmission of block 620 can complete before the FoV in the 3D environment is changed to include the objects from the predicted FoV from block 616 such that, when the objects are to be rendered in a subsequent frame, a client computing system can quickly load textures for the objects from a local cache instead of waiting to receive the textures over a network.

Example Execution

Figure 7A:
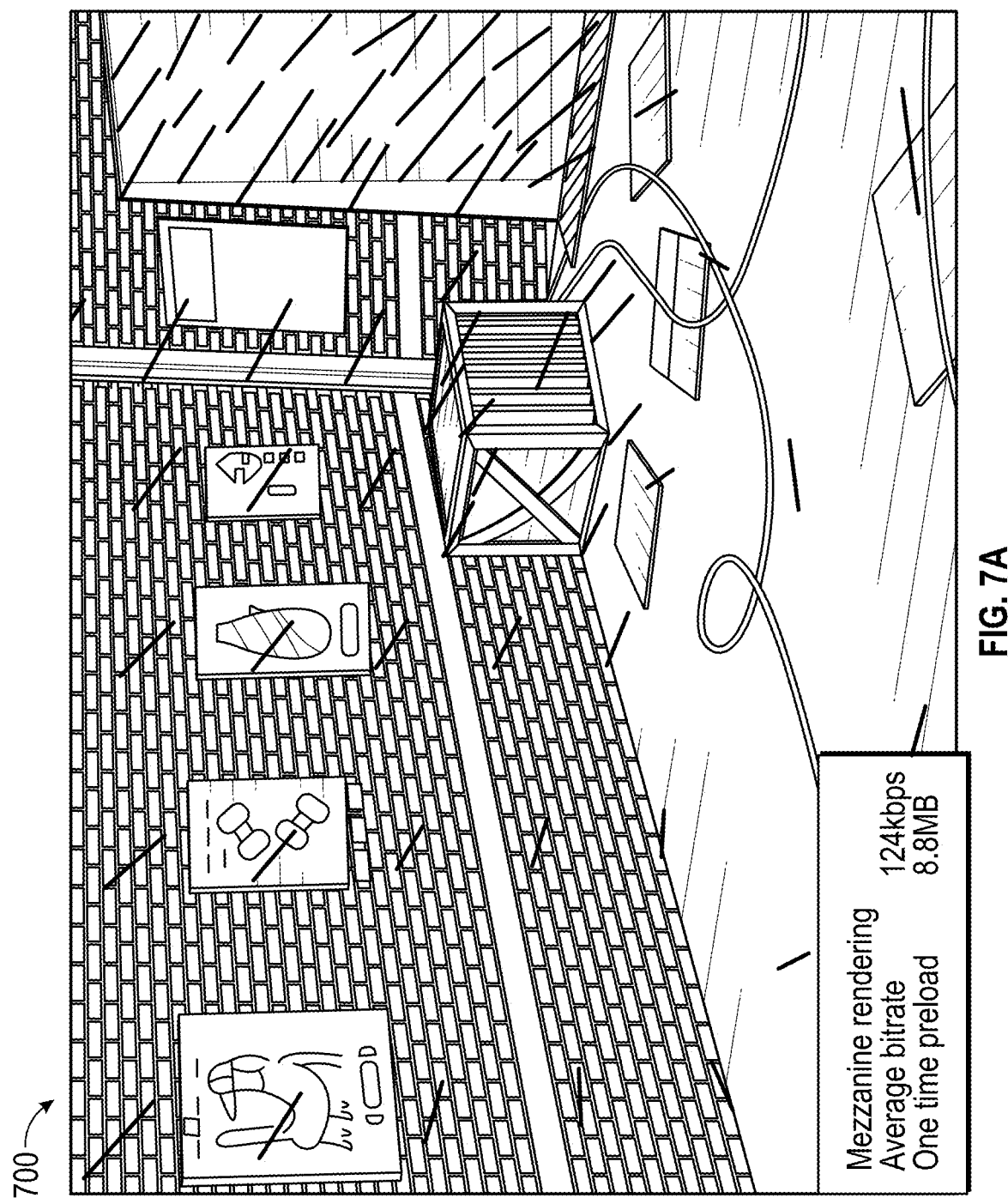
FIG. 7A shows an example of a rasterized frame of a room.
Figure 7B:
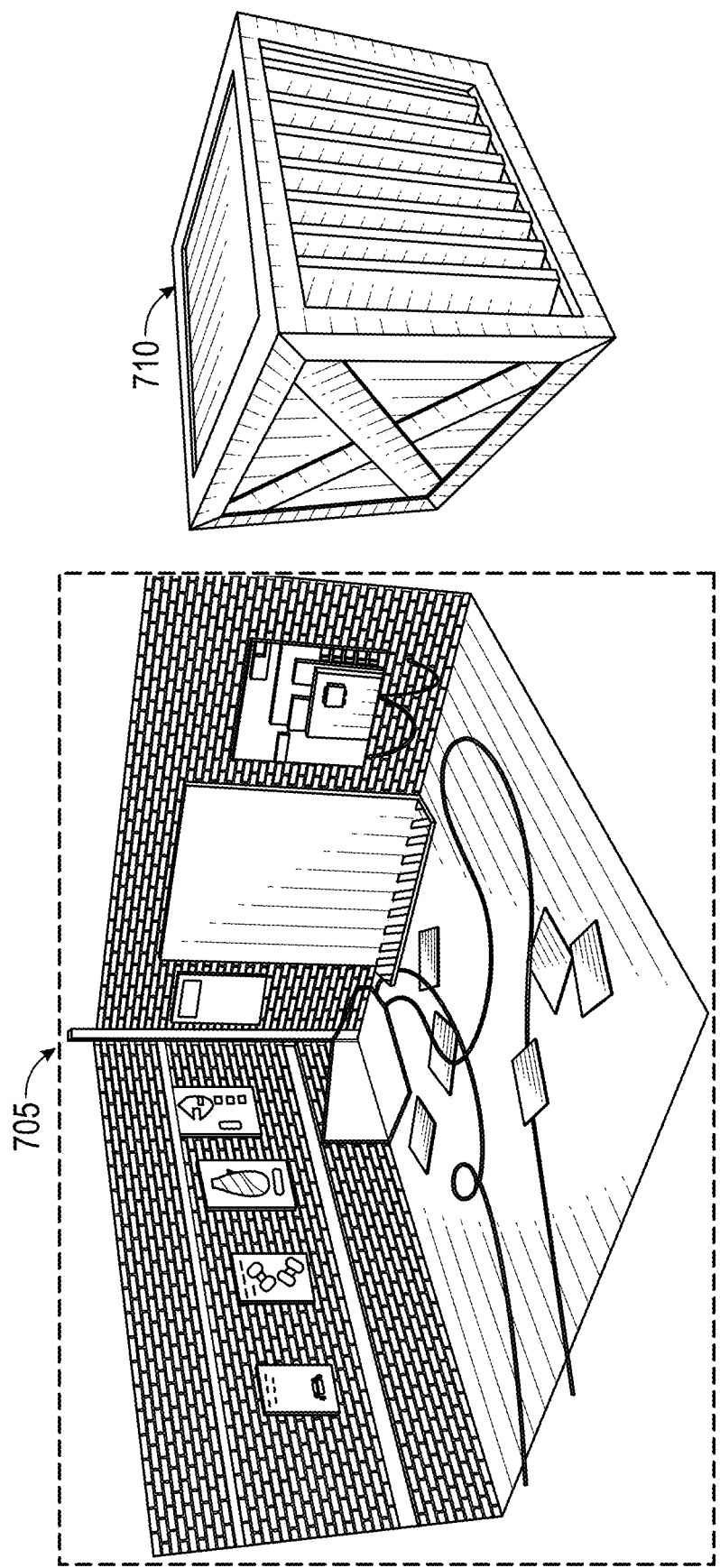
FIG. 7B shows two, 2D textures for rasterizing the frame of FIG. 7A.

FIG. 7A shows an example of a rasterized frame 700 of a room, and FIG. 7B shows two 2D textures for rasterizing the frame 700. The frame 700 includes two walls, a box, and a floor. The first 2D texture 705 includes a 2D texture for the walls and floor. The second 2D texture 710 includes a 2D texture for a box.

A plurality of white vector lines indicates how vertexes of meshes of objects in the 2.5D scene change from one frame to the next as a viewpoint within a corresponding 3D environment moves to the left while rotating to the right. The white vector lines can also indicate how objects move within the environment. In various embodiments, the vectors can be vertexes of mesh boundaries and/or vertexes of mesh interiors.

The frame 700 is rendered by a client computing system according to the techniques disclosed herein. A one-time data preload (such as described in block 502 of FIG. 5) of about 8.8 MB is transmitted from a server computing system to a client computing system before the frame 700 is rasterized. The preload data can include, for example, a first 2D texture 705 of the floors and walls of the room and a second 2D texture 710 of the box. Although illustrated in black and white, it will be understood that the textures and rendered frames can be in color.

The room texture 705 is a 2D texture, wherein vertexes of the texture are associated with a corresponding 2D mesh for the room. The box texture 710 is also a 2D texture generated from a first viewpoint, wherein vertexes of the texture are associated with a corresponding 2D mesh for the box. A second box texture (not shown) can be generated from a second viewpoint on the other side of the box so that a texture for the other side of the box is available. The server computing system can generate the 2D textures and 2D meshes for the room and box as seen from a particular viewpoint and include depth data indicating that the box texture 710 is in front of the room texture 705. As shown in the frame 700, the box causes a shadow to be cast on the wall behind the box. Accordingly, the server computing system can bake the shadow into the 2D texture 705. A third texture of text for display on a wall in the room is not shown.

The server can also determine, for each frame, updates for the 2D meshes (such as represented by the white line vectors imposed on the frame 700) indicating how the positions of vertexes of the meshes appear to move or change as a viewpoint moves or changes. Accordingly, updates to individual frames can include updates to the vertexes of objects without re-transmitting textures. So long as a viewpoint remains in the room of the 3D environment and observes the wall and box, the frames from that viewpoint can be updated using a bitrate of about 128 kbps. When additional objects are predicted to come within a FoV, then textures for additional objects can be downloaded by the client.

In some embodiments, a field of view may suddenly change before a client computing system has received or loaded textures for all the objects. In such situations, the 2D meshes and depths can still be quickly transmitted to a client, but textures for the objects may take longer to transmit. The system can be configured to reduce the frame rate to allow more time for texture transmission and/or quickly transmit low resolution textures to the client. The client can then rasterize the next frame using the low resolution textures. Higher resolution textures can then be progressively transmitted to the client over the next several frames, and the client can use the higher resolution textures for each object as soon as the higher resolution textures become available to the client.

Example Hardware Configuration of Computing System

Figure 8:
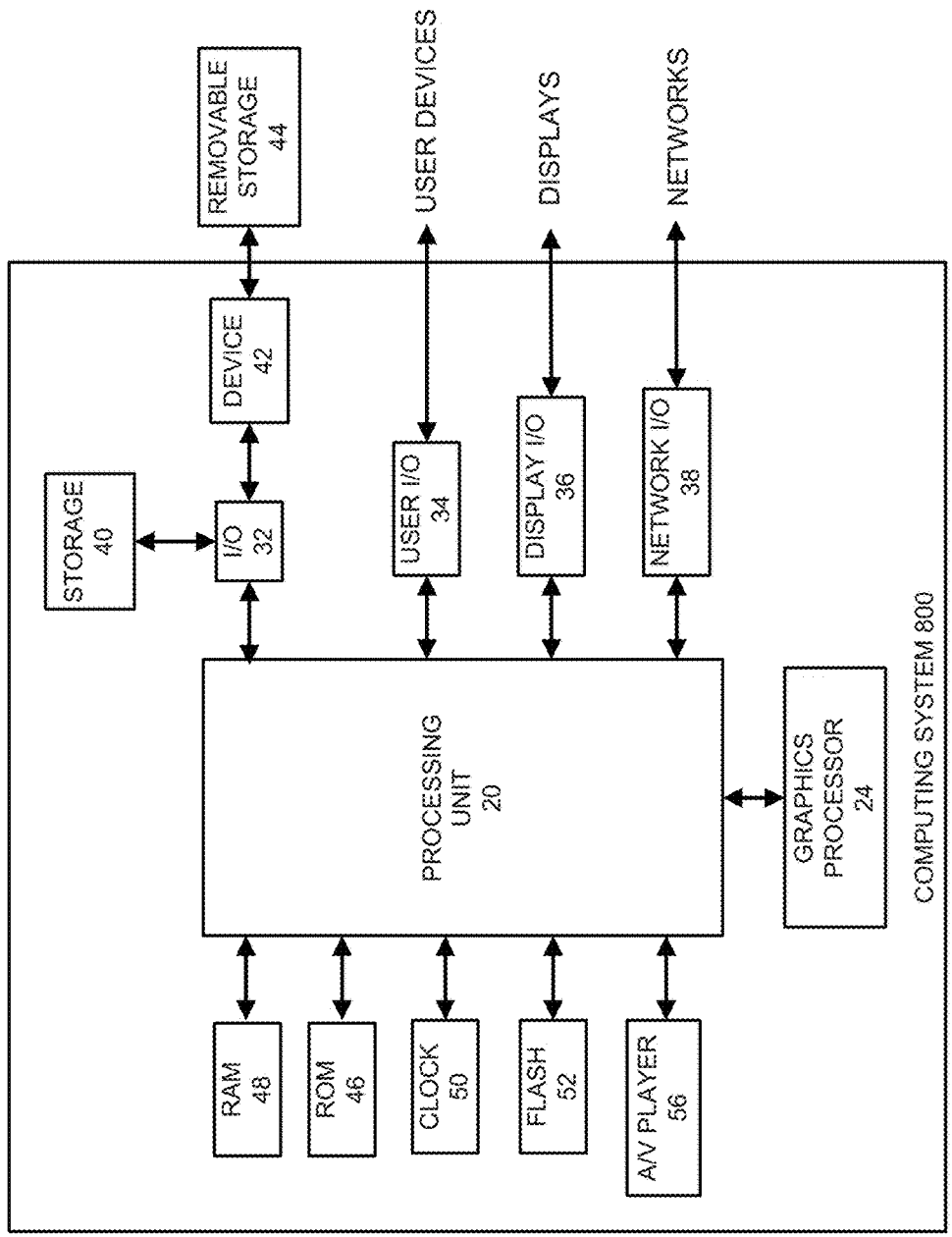
FIG. 8 illustrates an embodiment of a hardware configuration for a computing system.

FIG. 8 illustrates an embodiment of a hardware configuration for a computing system 800, such as the computing systems 102 or 130 shown in FIG. 1. Other variations of the computing system 800 may be substituted for the examples explicitly presented herein, such as removing or adding components to the computing system 800. The computing system 800 may include a computer, a server, a smart phone, a tablet, a personal computer, a desktop, a laptop, a smart television, and the like.

As shown, the computing system 800 includes a processing unit 20 that interacts with other components of the computing system 800 and also components external to the computing system 800. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The computing system 800 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the computing system 800 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 800 also includes various components for enabling input/output, such as an I/O 32, a user I/O 34, a display I/O 36, and a network I/O 38. As previously described, the input/output components may, in some cases, include touch-enabled devices. The I/O 32 interacts with storage element 40 and, through a device 42, removable storage media 44 in order to provide storage for the computing system 800. The storage element 40 can store a database that includes the images, gameplay logs, and/or AI models. Processing unit 20 can communicate through I/O 32 to store data, such as game state data and any shared data files. In addition to storage 40 and removable storage media 44, the computing system 800 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing system 800 on a display device, such as graphics, user interfaces, video, and/or other visual content. The computing system 800 may comprise one or more integrated displays configured to receive display output signals produced by the display I/O 36, which may be output for display to a user. According to some embodiments, display output signals produced by the display I/O 36 may also be output to one or more display devices external to the computing system 800.

The computing system 800 can also include other features that may be used with a game, such as a clock 50, flash memory 52, and other components. An audio/video player 56 might also be used to play a video sequence, such as a movie. It should be understood that other components may be provided in the computing system 800 and that a person skilled in the art will appreciate other variations of the computing system 800.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing system 800 is turned off or loses power. In some embodiments, a client computing system can locally cache textures in a buffer in the RAM or other memory.

As computing system 800 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computing system comprising:
a network interface for communicating with a client over a network; and
one or more processors configured to execute computer readable instructions to perform steps comprising:
hosting a video game application including a 3D environment, wherein objects in the 3D environment are assigned coordinates in 3D space;
transmitting, to the client over the network, a 2D texture for a first object in the 3D environment;
calculating 2D vertexes of a 2D mesh of the first object, wherein the 2D vertexes are positioned on a 2D plane as seen from a first viewpoint in the 3D environment;
transmitting, to the client over the network, the 2D vertexes of the first object and depth data for the first object;
updating a state of the video game application;
determining a second viewpoint in the 3D environment;
calculating updated 2D vertexes of the 2D mesh of the first object, wherein the updated 2D vertexes are positioned on a 2D plane as seen from the second viewpoint; and
transmitting the updated 2D vertexes to the client over the network.

2. The computing system of claim 1, wherein the one or more processors are configured to execute computer readable instructions to perform steps further comprising:
receiving user inputs from the client; and
determining the second viewpoint based on at least the user inputs.

3. The computing system of claim 1, wherein the one or more processors are configured to execute computer readable instructions to perform steps further comprising:
determining a likelihood of a second object in the 3D environment coming into a field of view associated with the first viewpoint; and
transmitting, to the client, a 2D texture for the second object.

4. The computing system of claim 3, wherein the one or more processors are configured to execute computer readable instructions to perform steps further comprising:
progressively transmitting of the 2D texture for the second object to the client over the network while also transmitting data for a plurality of video frames; and
completing the progressive transmission of the 2D texture for the second object before the second object comes into the field of view.

5. The computing system of claim 3, wherein the likelihood is determined based on at least one of:
a future location of a viewpoint in the 3D environment;
a current location of the viewpoint in the 3D environment;
a location of a character of the video game application in the 3D environment;
user inputs received from the client; or
a position of the second object in the 3D environment.

6. The computing system of claim 1, wherein the one or more processors are configured to execute computer readable instructions to perform steps further comprising:
transmitting a second 2D texture for the first object to the client, wherein the second 2D texture has a higher level of detail than the 2D texture.

7. The computing system of claim 6, wherein the level of detail of the 2D texture is determined based on at least a proximity to the first object and a size of the first object.

8. The computing system of claim 1, wherein the one or more processors are configured to execute computer readable instructions to perform steps further comprising:
determining textures that are locally cached on the client; and
transmitting one or more textures based on at least the locally cached textures, wherein textures that are locally cached are omitted from the transmission.

9. The computing system of claim 8, wherein the one or more processors are configured to execute computer readable instructions to perform steps further comprising transmitting the one or more textures based on at least a predicted viewpoint in the 3D environment.

10. A method for streaming video of a 3D environment using 2.5D data, the method comprising:
hosting a video game application including a 3D environment, wherein objects in the 3D environment are assigned coordinates in 3D space;
transmitting, to a client over a network, a 2D texture for a first object in the 3D environment;
calculating 2D vertexes of a 2D mesh of the first object, wherein the 2D vertexes are positioned on a 2D plane as seen from a first viewpoint in the 3D environment;
transmitting, to the client over the network, the 2D vertexes of the first object and depth data for the first object;
updating a state of the video game application;
determining a second viewpoint in the 3D environment;
calculating updated 2D vertexes of the 2D mesh of the first object, wherein the updated 2D vertexes are positioned on a 2D plane as seen from the second viewpoint; and
transmitting the updated 2D vertexes to the client over the network.

11. The method of claim 10 further comprising:
receiving user inputs from the client; and
determining the second viewpoint based on at least in part on the user inputs.

12. The method of claim 10 further comprising:
determining a likelihood of a second object in the 3D environment coming into a field of view associated with the first viewpoint; and
transmitting, to the client, a 2D texture for the second object.

13. The method of claim 12 further comprising:
progressively transmitting of the 2D texture for the second object to the client over the network while also transmitting data for a plurality of video frames; and
completing the progressive transmission of the 2D texture for the second object before the second object comes into the field of view.

14. The method of claim 12, wherein the likelihood is determined based on at least one of:
a future location of a viewpoint in the 3D environment;
a current location of the viewpoint in the 3D environment;
a location of a character of the video game application in the 3D environment;
user inputs received from the client; or
a position of the second object in the 3D environment.

15. The method of claim 10 further comprising:
transmitting a second 2D texture for the first object to the client, wherein the second 2D texture has a higher level of detail than the 2D texture.

16. The method of claim 15, wherein the level of detail of the 2D texture is determined based on at least a proximity to the first object and a size of the first object.

17. The method of claim 10 further comprising:
determining textures that are locally cached on the client; and
transmitting one or more textures based on at least the locally cached textures, wherein textures that are locally cached are omitted from the transmission.

18. The method of claim 17 further comprising transmitting the one or more textures based on at least a predicted viewpoint in the 3D environment.

19. A non-transitory computer-readable storage medium storing computer executable instructions that, when executed by one or more computing devices, configure the one or more computing devices to perform operations comprising:
hosting a video game application including a 3D environment, wherein objects in the 3D environment are assigned coordinates in 3D space;
transmitting, to a client over a network, a 2D texture for a first object in the 3D environment;
calculating 2D vertexes of a 2D mesh of the first object, wherein the 2D vertexes are positioned on a 2D plane as seen from a first viewpoint in the 3D environment;
transmitting, to the client over the network, the 2D vertexes of the first object and depth data for the first object;
updating a state of the video game application;
determining a second viewpoint in the 3D environment;
calculating updated 2D vertexes of the 2D mesh of the first object, wherein the updated 2D vertexes are positioned on a 2D plane as seen from the second viewpoint; and
transmitting the updated 2D vertexes to the client over the network.

20. The non-transitory computer-readable storage medium of claim 19, wherein the one or more computing devices are further configured to perform operations further comprising:
determining a likelihood of a second object in the 3D environment coming into a field of view associated with the first viewpoint; and
transmitting, to the client, a 2D texture for the second object.

* * * * *